(12) United States Patent
Weeks

(10) Patent No.: US 9,007,153 B2
(45) Date of Patent: Apr. 14, 2015

(54) PROTECTION DEVICE WITH A SANDWICHED CANTILEVER BREAKER MECHANISM

(71) Applicant: Pass & Seymour, Inc., Syracuse, NY (US)

(72) Inventor: Richard Weeks, Little York, NY (US)

(73) Assignee: Pass & Seymour, Inc., Syracuse, NY (US)

( * ) Notice: Subject to any disclaimer, the term of this patent is extended or adjusted under 35 U.S.C. 154(b) by 0 days.

(21) Appl. No.: 13/898,127

(22) Filed: May 20, 2013

(65) Prior Publication Data

US 2013/0250459 A1    Sep. 26, 2013

Related U.S. Application Data

(63) Continuation of application No. 13/355,648, filed on Jan. 23, 2012, now Pat. No. 8,446,234, which is a continuation of application No. 13/026,845, filed on Feb. 14, 2011, now Pat. No. 8,102,226, which is a continuation of application No. 12/553,573, filed on Sep. 3, 2009, now Pat. No. 7,936,238, which is a continuation of application No. 11/615,277, filed on Dec. 22, 2006, now Pat. No. 7,598,828, which is a continuation-in-part of application No. 10/942,633, filed on Sep. 16, 2004, now Pat. No. 7,173,799, which is a continuation-in-part of application No. 10/900,769, filed on Jul. 28, 2004, now Pat. No. 7,154,718.

(60) Provisional application No. 60/541,506, filed on Feb. 3, 2004.

(51) Int. Cl.
| | |
|---|---|
| *H01H 73/00* | (2006.01) |
| *H01H 83/06* | (2006.01) |
| *H01H 83/04* | (2006.01) |
| *H02H 3/08* | (2006.01) |
| *H01H 71/04* | (2006.01) |

(52) U.S. Cl.
CPC ............. *H01H 83/04* (2013.01); *H02H 3/08* (2013.01); *H01H 2071/044* (2013.01)

(58) Field of Classification Search
CPC ....................................................... H01H 83/04
USPC ........................................ 335/18; 361/42–50
See application file for complete search history.

(56) References Cited

U.S. PATENT DOCUMENTS

| | | |
|---|---|---|
| 3,930,187 A | 12/1975 | Misencik |
| 4,010,432 A | 3/1977 | Klein et al. |
| 4,019,120 A | 4/1977 | Fattic |
| 4,672,501 A | 6/1987 | Bilac et al. |
| 4,685,024 A | 8/1987 | Martellock et al. |
| 4,742,422 A | 5/1988 | Tigges |
| 4,802,052 A * | 1/1989 | Brant et al. .................. 361/42 |
| 4,816,957 A | 3/1989 | Irwin |
| 4,831,496 A | 5/1989 | Brant et al. |

(Continued)

*Primary Examiner* — Alexander Talpalatski
(74) *Attorney, Agent, or Firm* — Daniel P. Malley; Bond Schoneck & King, PLLC

(57) ABSTRACT

The present invention is directed to a protective electrical wiring device that includes at least one first stop member disposed proximate at least one first conductor. The at least one first stop member is configured to limit the movement of the at least one first conductor when the circuit interrupting assembly moves between the reset position and the tripped position such that a gap is established between the plurality of circuit interrupting contacts in the tripped state, the gap being substantially greater than or equal to a predetermined distance.

24 Claims, 19 Drawing Sheets

(56) References Cited

U.S. PATENT DOCUMENTS

| | | |
|---|---|---|
| 4,872,087 A | 10/1989 | Brant |
| 4,998,067 A | 3/1991 | Puckett et al. |
| 5,072,328 A | 12/1991 | Dvorak et al. |
| 5,202,662 A | 4/1993 | Bienwald et al. |
| 5,457,444 A * | 10/1995 | Cook ............................ 335/18 |
| 5,459,630 A | 10/1995 | MacKenzie et al. |
| 5,517,165 A * | 5/1996 | Cook ............................ 335/18 |
| 5,594,398 A * | 1/1997 | Marcou et al. .................. 335/18 |
| 5,600,524 A | 2/1997 | Neiger et al. |
| 5,638,243 A | 6/1997 | Torezan et al. |
| 5,661,623 A | 8/1997 | McDonald et al. |
| 5,715,125 A | 2/1998 | Neiger et al. |
| 5,834,940 A | 11/1998 | Brooks et al. |
| 5,844,759 A | 12/1998 | Hirsh et al. |
| 5,917,391 A | 6/1999 | Mahaney et al. |
| 5,960,888 A | 10/1999 | Moore, Sr. |
| 5,973,586 A * | 10/1999 | Mertler, Jr. .................. 337/299 |
| 6,040,967 A | 3/2000 | DiSalvo |
| 6,052,265 A | 4/2000 | Zaretsky et al. |
| 6,111,733 A | 8/2000 | Neiger et al. |
| 6,191,589 B1 | 2/2001 | Clunn |
| 6,246,558 B1 | 6/2001 | DiSalvo et al. |
| 6,262,871 B1 | 7/2001 | Nemir et al. |
| 6,288,882 B1 | 9/2001 | DiSalvo et al. |
| 6,313,642 B1 | 11/2001 | Brooks |
| 6,348,666 B2 | 2/2002 | Rival et al. |
| 6,407,893 B1 | 6/2002 | Neiger et al. |
| 6,421,214 B1 | 7/2002 | Packard et al. |
| 6,426,634 B1 | 7/2002 | Clunn et al. |
| 6,437,700 B1 | 8/2002 | Herzfeld et al. |
| 6,437,953 B2 | 8/2002 | DiSalvo et al. |
| 6,472,882 B1 | 10/2002 | Tiemann et al. |
| 6,477,022 B1 | 11/2002 | Ennis et al. |
| 6,487,052 B1 | 11/2002 | Macpherson et al. |
| 6,522,510 B1 | 2/2003 | Finlay et al. |
| 6,525,541 B1 | 2/2003 | Leopold |
| 6,580,344 B2 | 6/2003 | Li |
| 6,590,753 B1 | 7/2003 | Finlay |
| 6,611,406 B2 | 8/2003 | Neiger et al. |
| 6,621,388 B1 | 9/2003 | Macbeth |
| 6,643,108 B2 | 11/2003 | Cline et al. |
| 6,657,834 B2 | 12/2003 | DiSalvo |
| 6,670,870 B2 | 12/2003 | Macbeth |
| 6,671,145 B2 | 12/2003 | Germain et al. |
| 6,674,289 B2 | 1/2004 | Macbeth |
| 6,697,237 B2 | 2/2004 | Duve |
| 6,717,782 B2 | 4/2004 | DiSalvo et al. |
| 6,724,591 B2 | 4/2004 | Clarey et al. |
| 6,771,152 B2 | 8/2004 | Germain et al. |
| 6,788,173 B2 | 9/2004 | Germain et al. |
| 6,804,904 B2 | 10/2004 | Garcia |
| 6,807,035 B1 | 10/2004 | Baldwin et al. |
| 6,807,036 B2 | 10/2004 | Baldwin |
| 6,828,886 B2 * | 12/2004 | Germain et al. ................ 335/18 |
| 6,829,124 B2 | 12/2004 | Leopold et al. |
| 6,831,819 B2 | 12/2004 | Nemir et al. |
| 6,842,095 B2 | 1/2005 | Macbeth |
| 6,864,766 B2 | 3/2005 | DiSalvo et al. |
| 6,867,954 B2 | 3/2005 | Wu et al. |
| 6,873,158 B2 | 3/2005 | Macbeth |
| 6,930,574 B2 | 8/2005 | Gao |
| 6,946,935 B2 * | 9/2005 | Wu et al. ......................... 335/18 |
| 6,952,150 B2 | 10/2005 | Radosavljevic et al. |
| 6,954,125 B2 | 10/2005 | Wu et al. |
| 6,958,895 B1 | 10/2005 | Radosavljevic et al. |
| 6,980,005 B2 | 12/2005 | Finlay, Sr. et al. |
| 6,984,988 B2 | 1/2006 | Yamamoto |
| 6,998,945 B2 | 2/2006 | Huang et al. |
| 7,019,952 B2 | 3/2006 | Huang et al. |
| 7,031,125 B2 | 4/2006 | Germain et al. |
| 7,031,126 B2 | 4/2006 | Bonilla et al. |
| 7,049,910 B2 | 5/2006 | Campolo et al. |
| 7,049,911 B2 | 5/2006 | Germain et al. |
| 7,154,718 B1 | 12/2006 | Finlay, Sr. et al. |
| 7,173,799 B1 | 2/2007 | Weeks et al. |
| 7,184,250 B2 | 2/2007 | Bonilla et al. |
| 7,215,370 B2 | 5/2007 | Chiang et al. |
| 7,253,629 B1 | 8/2007 | Richards et al. |
| 7,271,987 B1 | 9/2007 | Zhang et al. |
| 7,400,477 B2 | 7/2008 | Campolo et al. |
| 7,403,086 B2 | 7/2008 | Wu et al. |
| 7,414,499 B2 | 8/2008 | Germain |
| 7,439,833 B2 | 10/2008 | Germain |
| 7,538,994 B2 | 5/2009 | Bonilla et al. |
| 7,542,252 B2 | 6/2009 | Chan et al. |
| 7,737,809 B2 | 6/2010 | Germain et al. |
| 7,764,151 B2 | 7/2010 | DiSalvo et al. |
| 7,889,465 B2 | 2/2011 | Bonilla et al. |
| 8,054,595 B2 | 11/2011 | DiSalvo et al. |
| 8,089,738 B2 | 1/2012 | Bonilla et al. |
| 8,125,748 B2 | 2/2012 | Zheng |
| 2001/0033468 A1 | 10/2001 | Macbeth |
| 2002/0135957 A1 | 9/2002 | Chan et al. |
| 2002/0181175 A1 | 12/2002 | Baldwin |
| 2003/0016477 A1 | 1/2003 | Li |
| 2003/0080837 A1 | 5/2003 | Macbeth |
| 2003/0085783 A1 | 5/2003 | Macbeth |
| 2003/0086220 A1 | 5/2003 | Nelson |
| 2003/0151478 A1 | 8/2003 | Radosavljevic et al. |
| 2004/0004795 A1 | 1/2004 | Chan et al. |
| 2004/0080879 A1 | 4/2004 | Radosavljevic et al. |
| 2004/0264077 A1 | 12/2004 | Radosavljevic et al. |
| 2005/0001607 A1 | 1/2005 | Berland et al. |
| 2005/0018062 A1 | 1/2005 | Chiang et al. |
| 2005/0117264 A1 | 6/2005 | Aromin |
| 2005/0140476 A1 | 6/2005 | Gao |
| 2005/0212522 A1 | 9/2005 | Finlay, Sr. et al. |

\* cited by examiner

PROTECTION DEVICE WITH A SANDWICHED CANTILEVER BREAKER MECHANISM

CROSS-REFERENCE TO RELATED APPLICATIONS

This is a continuation of co-pending U.S. patent application Ser. No. 13/355,648 filed on Jan. 23, 2012, which is a continuation of U.S. patent application Ser. No. 13/026,845 filed on Feb. 14, 2011, which is a continuation of co-pending U.S. patent application Ser. No. 12/553,573 filed on Sep. 3, 2009, which is a continuation of U.S. patent application Ser. No. 11/615,277 filed on Dec. 22, 2006, which is a continuation-in-part of U.S. patent application Ser. No. 10/942,633 filed on Sep. 16, 2004, which is a continuation-in-part of U.S. patent application Ser. No. 10/900,769 filed on Jul. 28, 2004, the contents of which are relied upon and incorporated herein by reference in their entirety, and the benefit of priority under 35 U.S.C. §120 is hereby claimed, U.S. patent application Ser. No. 10/900,769 claims priority under 35 U.S.C. §119(e) to U.S. Provisional Patent Application 60/541,506 filed on Feb. 3, 2004.

BACKGROUND OF THE INVENTION

1. Field of the Invention

The present invention relates generally to protection devices, and particularly to protection devices having power to the receptacles cut-off features.

2. Technical Background

Most residential, commercial, or industrial buildings include one or more breaker panels that are configured to receive AC power from a utility source. The breaker panel distributes AC power to one or more branch electric circuits installed in the building. The electric circuits transmit AC power to one or more electrically powered devices, commonly referred to in the art as load circuits. Each electric circuit typically employs one or more electric circuit protection devices. Examples of such devices include ground fault circuit interrupters (GFCIs), arc fault circuit interrupters (AFCIs), or both GFCIs and AFCIs. Further, AFCI and GFCI protection may be included in one protective device.

The circuit protection devices are configured to interrupt the flow of electrical power to a load circuit under certain fault conditions. When a fault condition is detected, the protection device eliminates the fault condition by interrupting the flow of electrical power to the load circuit by causing interrupting contacts to break the connection between the line terminals and load terminals. As indicated by the name of each respective device, an AFCI protects the electric circuit in the event of an arc fault, whereas a GFCI guards against ground faults. An arc fault is a discharge of electricity between two or more conductors. An arc fault may be caused by damaged insulation on the hot line conductor or neutral line conductor, or on both the hot line conductor and the neutral line conductor. The damaged insulation may cause a low power arc between the two conductors and a fire may result. An arc fault typically manifests itself as a high frequency current signal. Accordingly, an AFCI may be configured to detect various high frequency signals and de-energize the electrical circuit in response thereto.

With regard to GFCIs, a ground fault occurs when a current carrying (hot) conductor creates an unintended current path to ground. A differential current is created between the hot/ neutral conductors because some of the current flowing in the circuit is diverted into the unintended current path. The unintended current path represents an electrical shock hazard. Ground faults, as well as arc faults, may also result in fire. GFCIs intended to prevent fire have been called ground-fault equipment protectors (GFEPs.)

Ground faults occur for several reasons. First, the hot conductor may contact ground if the electrical wiring insulation within a load circuit becomes damaged. This scenario represents a shock hazard. For example, if a user comes into contact with a hot conductor while simultaneously contact ground, the user will experience a shock. A ground fault may also occur when the equipment comes in contact with water. A ground fault may also result from damaged insulation within the electrical power distribution system.

As noted above, a ground fault creates a differential current between the hot conductor and the neutral conductor. Under normal operating conditions, the current flowing in the hot conductor should equal the current in the neutral conductor. Accordingly, GFCIs are typically configured to compare the current in the hot conductor to the return current in the neutral conductor by sensing the differential current between the two conductors. When the differential current exceeds a predetermined threshold, usually about 6 mA, the GFCI typically responds by interrupting the circuit. Circuit interruption is typically effected by opening a set of contacts disposed between the source of power and the load. The GFCI may also respond by actuating an alarm of some kind.

Another type of ground fault may occur when the load neutral terminal, or a conductor connected to the load neutral terminal, becomes grounded. This condition does not represent an immediate shock hazard. As noted above, a GFCI will trip under normal conditions when the differential current is greater than or equal to approximately 6 mA. However, when the load neutral conductor is grounded the GFCI becomes de-sensitized because some of the return path current is diverted to ground. When this happens, it may take up to 30 mA of differential current before the GFCI trips. This scenario represents a double-fault condition. In other words, when the user comes into contact with a hot conductor (the first fault) at the same time as contacting a neutral conductor that has been grounded on the load side (the second fault), the user may experience serious injury or death.

The aforementioned protective devices may be conveniently packaged in receptacles that are configured to be installed in outlet boxes. The protective device may be configured for various electrical power distribution systems, including multi-phase distribution systems. A receptacle typically includes input terminals that are configured to be connected to an electric branch circuit. Accordingly, the receptacle includes at least one hot line terminal and may include a neutral line terminal for connection to the hot power line and a neutral power line, respectively. The hot power line and the neutral power line, of course, are coupled to the breaker panel. The receptacle also includes output terminals configured to be connected to a load circuit. In particular, the receptacle has feed-through terminals that include a hot load terminal and a neutral load terminal. The receptacle also includes user accessible plug receptacles connected to the feed through terminals. Accordingly, load devices equipped with a cord and plug may access AC power by way of the user accessible plug receptacles.

However, there are drawbacks associated with hard-wiring the user accessible plug receptacles to the feed-through terminals. As noted above, when a fault condition is detected in the electrical distribution system, a circuit interrupter breaks the electrical coupling between the line and load terminals to remove AC power from the load terminals. If the protective device is wired correctly, AC power to the user accessible plug receptacles is also removed. However, power to the user accessible plug receptacles may not be removed if the protective device is miswired.

In particular, a miswire condition exists when the hot power line and the neutral power line are connected to the hot output terminal and the neutral output terminal, respectively. For 120 VAC distribution systems, the hot power line and the neutral power line are configured to be connected the hot line terminal and the neutral line terminal, respectively. If the electrical distribution system includes load wires, miswire is completed by connecting the load wires to the line terminals. A miswire condition may represent a hazard to a user when a cord connected load is plugged into the user accessible receptacle included in the device. Even if the circuit is interrupted in response to a true or simulated fault condition, AC power is present at the terminals of the receptacle because the feed-through (load) terminals and the receptacle terminals are hard-wired. Thus, the user is not protected if there is a fault condition in the cord-connected load.

Besides miswiring, failure of the device to interrupt a true fault condition or simulated fault condition may be due to the device having an internal fault condition, also know as an end of life condition. The device includes electro-mechanical components that are subject to reaching end of life, including electronic components that can open circuit or short circuit, and mechanical components such as the contacts of the circuit interrupter that can become immobile due to welding, and the like.

In one approach that has been considered, the protective device is configured to trip in response to a miswire condition. Thus, if the power source of the electrical distribution system is connected to the load terminals (i.e., a line-load miswire condition), the circuit interrupting contacts will break electrical connection. The installer is made aware of the miswired condition when he discovers that power is not available to the downstream receptacles coupled to the miswired receptacle. After the miswiring condition is remedied, the interrupting contacts in the device may be reset. One drawback to this approach becomes evident when the protective device is not coupled to any downstream receptacles. In this scenario, the installer may not become aware of the miswire condition.

Accordingly, there is a need to deny power to the user accessible receptacles when the device is tripped. This safety feature is especially needed when the protective device is miswired.

SUMMARY OF THE INVENTION

The present invention is configured to deny power to the user accessible plug receptacles when the device is tripped. Accordingly, the present invention provides a safety feature that eliminates a hazard condition that may be evident during a miswire condition of the protective device.

One aspect of the present invention is directed to a protective electrical wiring device that includes a housing assembly having a plurality of first terminals and a plurality of second terminals. At least one detection circuit is, at least partially disposed on a printed circuit board (PCB) and coupled to the plurality of first terminals or the plurality of second terminals, the at least one detection circuit being configured to detect at least one fault condition and provide a fault detection signal in response thereto, the at least one fault condition including a simulated fault condition. A circuit interrupting assembly is coupled to the at least one detection circuit, the circuit interrupting assembly including at least one first conductor coupled to the plurality of first terminals and at least one second conductor coupled to the plurality of second terminals, a plurality of circuit interrupting contacts being disposed on and distributed between the at least one first conductor and the at least one second conductor, the circuit interrupting assembly being movable between a reset position and a tripped position such that the plurality of circuit interrupting contacts are electrically coupled in the reset position and electrically decoupled in the tripped position. At least one first stop member is disposed proximate the at least one first conductor and at least one second stop member disposed proximate the at least one second conductor. The at least one first stop member is configured to limit the movement of the at least one first conductor in the direction of the PCB when the circuit interrupting assembly moves from the reset position to the tripped position, the at least one second stop member being configured to limit the movement of the at least one second conductor in the direction of the PCB when the circuit interrupting assembly moves from the reset position to the tripped position Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

DETAILED DESCRIPTION

Figure 1:
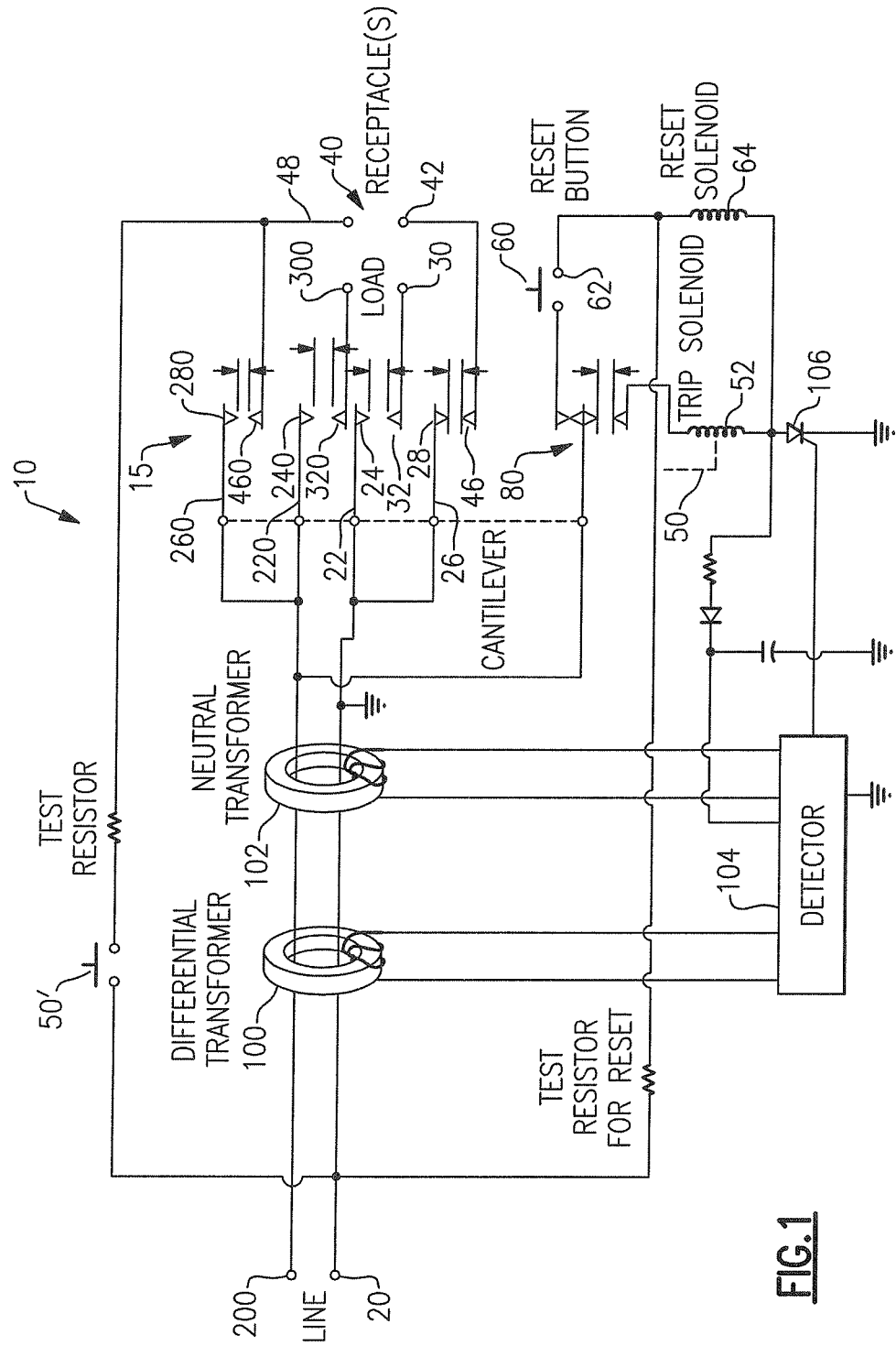
FIG. 1 is a block diagram of an electrical wiring device in accordance with a first embodiment of the present invention.

Reference will now be made in detail to the present embodiments of the invention, examples of which are illustrated in the accompanying drawings. Wherever possible, the same reference numbers will be used throughout the drawings to refer to the same or like parts. An exemplary embodiment of the wiring device of the present invention is shown in FIG. 1, and is designated generally throughout by reference numeral 10.

As embodied herein, and depicted in FIG. 1, a block diagram of an electrical wiring device 10 in accordance with a first embodiment of the present invention is disclosed. While FIG. 1 includes a GFCI, the present invention is equally applicably to AFCIs and/or other protective devices. The wiring device 10 includes a tripping mechanism that includes ground fault sensor 100 and grounded neutral sensor 102 coupled to detector 104. Detector 104 is coupled to silicon controlled rectifier (SCR) 106. SCR 106 is turned on in response to a detection signal from detector 104. SCR 106, in turn, signals trip solenoid 52 to actuate a pivotal latch mechanism 80 to open the contacts in contact assembly 15.

With regard to contact assembly 15, neutral line terminal 20 is connected to cantilever member 22 and cantilever member 26. Cantilevers 22 and 26 are coupled to latch mechanism 80. Cantilever member 22 includes a moveable contact 24. In the reset position, moveable contact 24 is configured to mate with stationary contact 32. Stationary contact 32 is coupled to neutral load feed-through terminal 30. Cantilever member 26 includes moveable contact 28. In the reset position, moveable contact 28 is configured to mate with stationary contact 46. Stationary contact 46 is coupled to the neutral contact 42 in receptacle 40. Hot line terminal 200 is connected to cantilever member 220 and cantilever member 260. Cantilevers 220 and 260 are also coupled to latch mechanism 80. Cantilever member 220 includes a moveable contact 240. In the reset position, moveable contact 240 is configured to mate with stationary contact 320, which is coupled to hot load feed-through terminal 300. Cantilever member 260 includes a moveable contact 280. In the reset position, moveable contact 280 is configured to mate with stationary contact 460, which is coupled to the hot contact 48 in receptacle 40.

Accordingly, when SCR 106 signals trip solenoid 52, latch mechanism 80 pulls the cantilevers 22, 26, 220, and 260 such that moveable contacts 24, 28, 240, and 280 are separated from stationary contacts 32, 46, 320, and 460, respectively. When reset button 60 is depressed, reset solenoid 64 is actuated. Solenoid 64 causes latch mechanism 80 to close the aforementioned pairs of contacts to thereby restore AC power.

The reset mechanism includes reset button 60, contacts 62, and reset solenoid 64. When reset button 60 is depressed, contacts 62 are closed to thereby initiate a test procedure. If the test procedure is successful, reset solenoid 64 is actuated, and latch mechanism 80 is toggled to reset device 10. When device 10 has an internal fault condition, the test procedure is unsuccessful, and the circuitry does not transmit a reset signal. The reset solenoid 64 is not actuated, and the device is not reset. As described above, latch mechanism 80 is toggled between the tripped state and the reset state by trip solenoid 52 and reset solenoid 64, respectively.

Latch mechanism 80 may be toggled to the tripped position by the fault detection circuitry, as described above, or by a user accessible test button 50. Alternatively, latch mechanism 80 may be tripped by the fault detection circuitry, as described above, and by an electrical test button 50'. The electrical test button 50' produces a simulated condition configured to test a portion of, or all of, the detection circuitry. A test acceptance signal toggles latch mechanism 80 to the tripped position. The simulated condition may be a test signal or an induced fault signal. Hereinafter, both of these signals will be referred to as simulated fault conditions.

Figure 2:
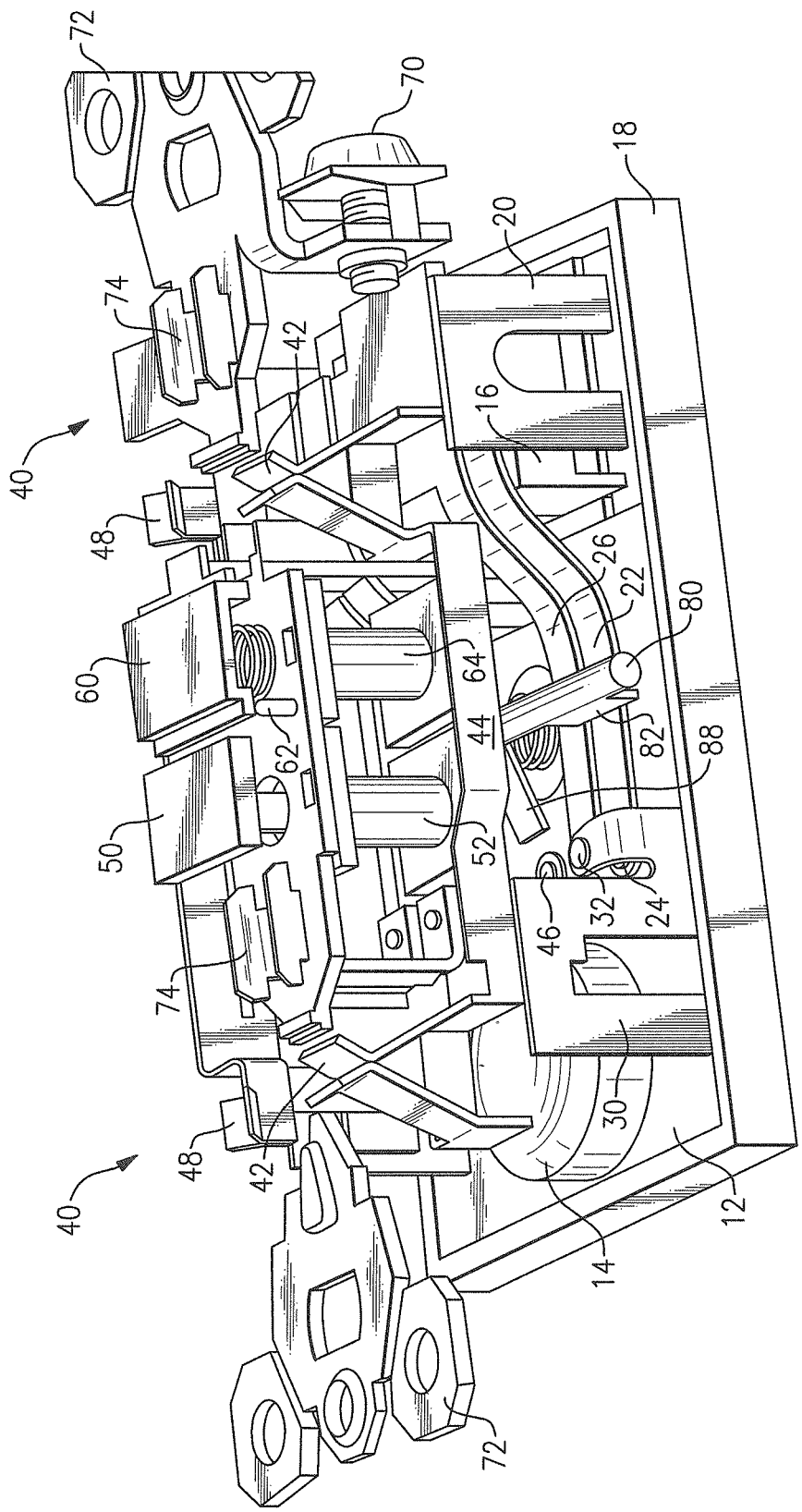
FIG. 2 is a perspective view of the electrical device depicted in FIG. 1.

Referring to FIG. 2, a perspective view of the electrical wiring device shown in FIG. 1 is disclosed. Electrical device 10 includes a circuit board 12 which is mounted on member 18. Movistor 14 and sensor coil assembly 16 houses ground fault sensor 100 and grounded neutral sensor 102 are mounted on circuit board 12. Circuit board 12 includes a protective circuit that is discussed in more detail below. Device 10 is configured to be coupled to AC electrical power by way of line neutral terminal 20 and line hot terminal 200 (not shown in FIG. 2). Power is provided to a load via load neutral terminal 30 and load hot terminal 300 (not shown in FIG. 1). Device 10 also provides power to user plug contacts by way of at least one receptacle 40. Receptacles 40 include neutral contact 42, hot contact 48, and ground contact 74. Ground contact 74 is electrically connected to ground terminal 70 and ground strap 72. Similarly, device 10 and receptacle 40 can be configured for other electrical distribution systems having a single phase or multiple phase power source that include at least one hot terminal and that may include a neutral terminal and/or ground terminal.

Line neutral cantilevers 22, 26 are connected at one end to line neutral terminal 20. At the other end, line cantilever 22 includes a terminal contact 24. In similar fashion, line cantilever 26 includes a terminal contact 28 adjacent to contact 24. Cantilevers 22 and 26 are flexibly connected to latch mechanism 80 by way of wiper arm 82. Load neutral terminal 30 is coupled to load neutral contact 32. Load neutral contact 32 and line neutral contact 24 form a pair of separable contacts. Receptacle neutral contact 42 is connected to member 44. Member 44 includes neutral contact 46. Neutral contact 46 and line neutral contact 28 also form a pair of separable contacts.

Latch mechanism 80 is actuated by test button 50 and reset button 60. Test button 50 is a mechanical actuator that is coupled to latch mechanism 80. When test button 50 is depressed, each separable contact pair is separated to remove power to the feed through terminals and the receptacle terminals. Reset button 60 is an electric switch mechanism that is actuated when button 60 closes contacts 62. Contacts 62 actuates solenoid 64. If the test is successful, each separable contact pair is closed. The operation of dual-solenoids 52, 64 will be discussed below in more detail.

Figure 3:
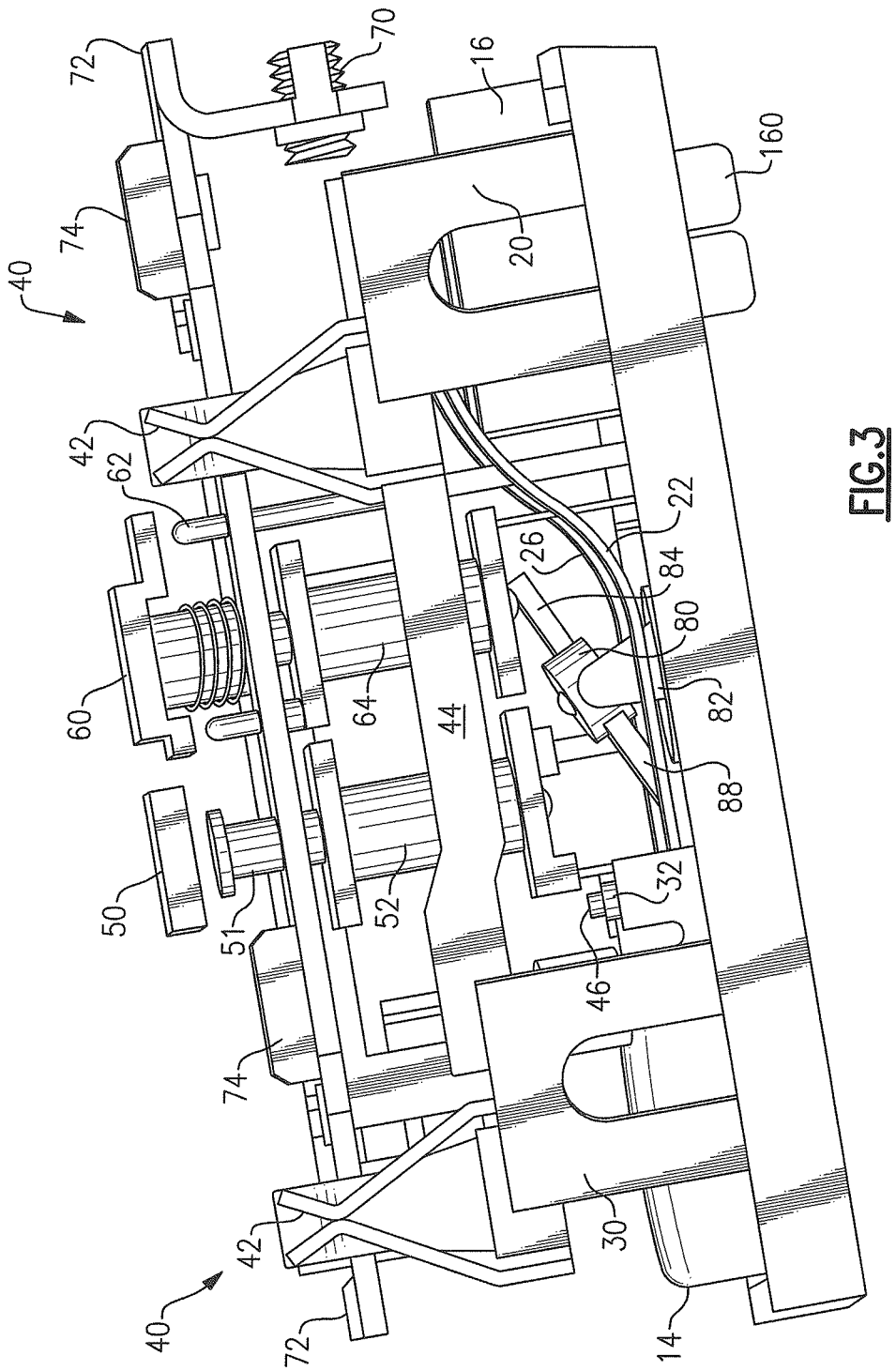
FIG. 3 is a side elevation view of the electrical wiring device depicted in FIG. 1.

Referring to FIG. 3, a side elevation view of the electrical wiring device 10 depicted in FIG. 1 is shown. FIG. 3 depicts a tripped state wherein power is denied to receptacles 40. Note that latch arm 88 is in a downward position such that line neutral contact 24 and line neutral contact 28 are not in contact with load neutral contact 32 and receptacle neutral contact 46, respectively. The reset mechanism operates as follows. When reset button 60 activates reset solenoid 64, latch arm 84 is forced downward; latch arm 88 is directed upward forcing flexible cantilevers 22 and 26 upward as well. This movement forces line neutral contact 24 against load neutral contact 32, and line neutral contact 28 against neutral contact 46.

Figure 4:
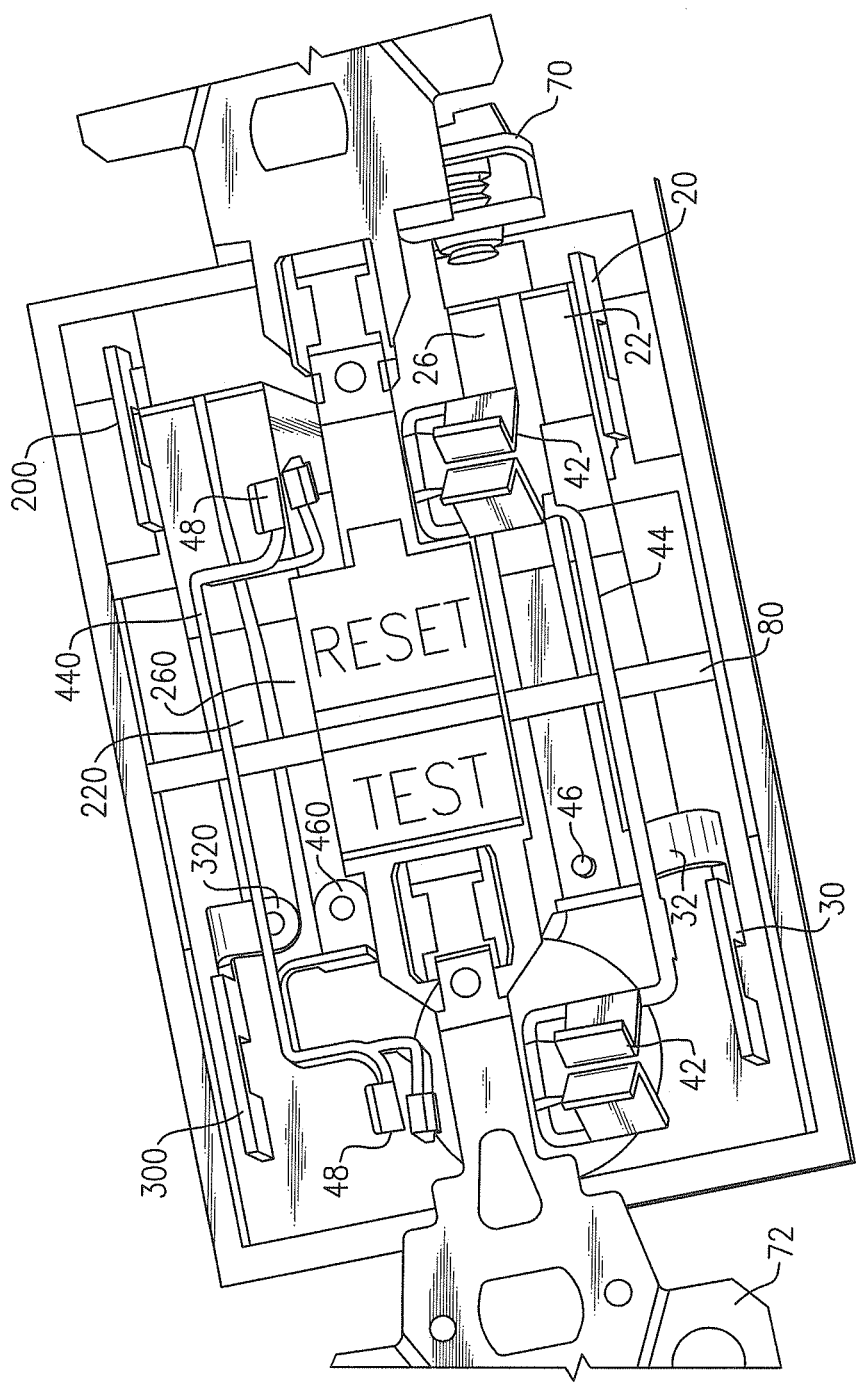
FIG. 4 is a top view of the electrical wiring device depicted in FIG. 1.

Referring to FIG. 4, a top view of the electrical wiring device depicted in FIG. 1 is disclosed. The "hot" side of device 10 is the mirror image of the "neutral" side of device 10. The line hot wire from the electrical distribution system is connected to line hot terminal 200, and the load hot wire is connected to load hot terminal 300. Hot receptacle contacts are connected to member 440. Cantilevers 220 and 260 include moveable hot contacts 240, 280, respectively. Hot contacts 240 and 280 are paired with fixed contacts 320 and 460, respectively. Accordingly, when device 10 is in the tripped state, as described above, contact pair 240/320 and contact pair 280/460 are opened. When latch 80 is toggled by reset button 60, reset solenoid 64 is activated. As a result, flexible cantilevers 220 and 260 are directed upward pressing line hot contact 240 against load hot contact 320, and line hot contact 280 against receptacle hot contact 460.

Referring to FIGS. 2-4, test solenoid 52 includes an armature 51. When solenoid 52 receives a signal from SCR 106, a magnetic force is induced in armature 51 to drive latch arm 88 downward, causing the contacts to separate. When test button 50 is depressed by the user, a mechanical force is applied to move arm 88 downward. Test button 50 and armature 51 may be configured such that the mechanical force applied to button 50 drives latch arm 88 downward. As a result, power is removed from both the feed-through terminals (30, 300) and from the receptacles 40. When reset button 60 is depressed, contacts 62 are closed and a test routine is initiated. The protective circuit disposed on circuit board 12 generates a test signal. The circuit is configured to sense and detect the test signal. If the test signal is successfully detected, the reset solenoid 64 is activated. In response, latch 80 is toggled in the other direction. Cantilevers 22, 26, 220, and 260 are spring-loaded and biased in an upward direction to close the contacts and provide power to the receptacle(s) 40 and feed-through terminals (30,300.) As noted above, if the test is not successful, solenoid 64 is not actuated and the contacts remain open.

In this embodiment, the device is typically tripped before being installed by the user. If the device is miswired by the installer, source power is not available to the reset solenoid due to the tripped condition. The device cannot be reset. As a result, AC power is denied to the receptacles until device 10 is wired correctly.

Figure 5:
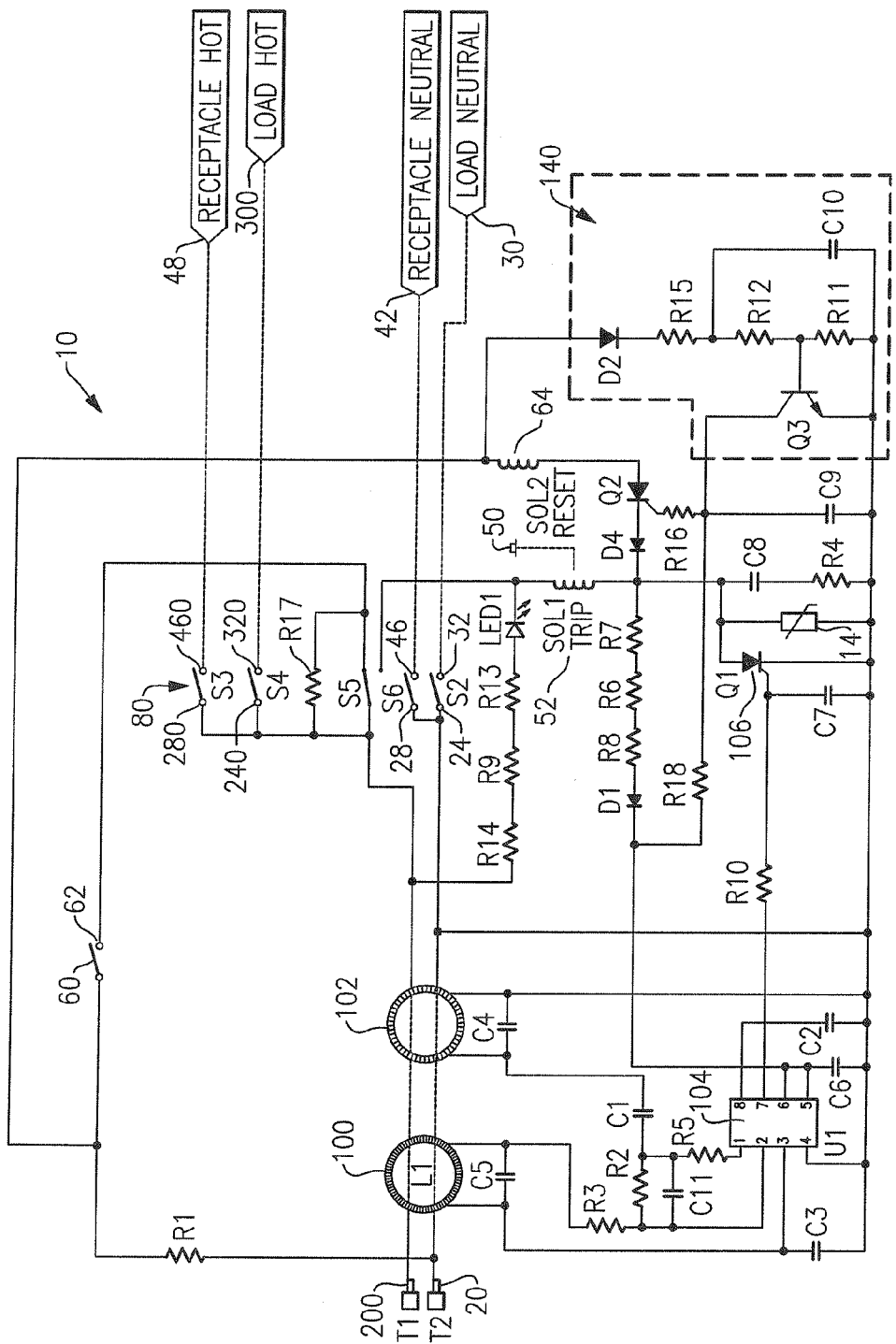
FIG. 5 is a schematic of the electrical device depicted in FIG. 1.

Referring to FIG. 5, a schematic of the electrical device 10 shown in FIGS. 1-4 is disclosed. When reset button 60 is depressed, contacts 62 are closed and a test signal is generated. If the circuit is operational, sensor 100 and detector 104 will sense and detect a differential current. A signal is provided to silicon controlled rectifier 106 and reset solenoid 64 is activated. As shown in FIGS. 1-4, reset solenoid 64 toggles latch 80 causing wiper arm 82 to separate from cantilevers 22, 26, 220, and 260. Cantilevers 22, 26, 220, and 260 are spring-loaded and biased in an upward direction. Accordingly, the cantilevers close the contacts and provide power to the receptacles 40 and load terminals (30,300.)

Subsequently, if the protection circuit senses and detects a fault condition, trip solenoid 52 is activated causing latch 80 to toggle in the other direction. Wiper arm 82 overcomes the spring loaded bias of the cantilevered arm and drives the cantilevers downward to thereby open the contacts and trip the device. As a result, power is removed from receptacles 40 and load terminals 30 and 300.

Figure 6:
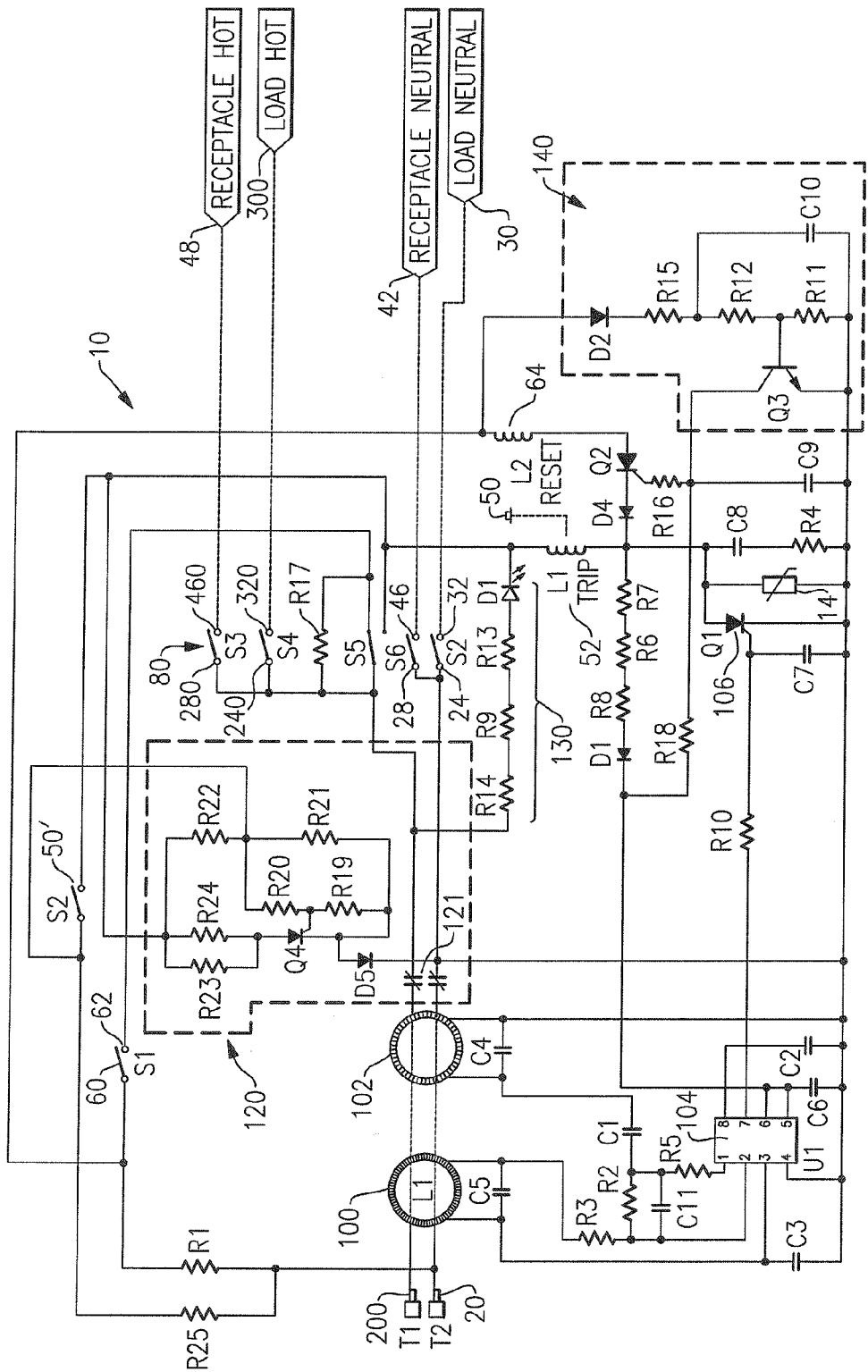
FIG. 6 is a schematic of the electrical device in accordance with an alternate embodiment of the present invention.

Referring to FIG. 6, a schematic of the electrical device in accordance with an alternate embodiment of the present invention is shown. The embodiment shown in FIG. 6 is similar to the embodiment of FIG. 5. However, the mechanical test button 50 and the trip actuator 52 shown in FIG. 5 are replaced by an electronic test button 50' in the embodiment shown in FIG. 6. The electronic test button causes a simulated test fault to be generated.

Trip solenoid 52 is activated when sensor 100 and detector 104 detect a fault condition. The contacts pairs 24 and 32, 28 and 46, 480 and 460, and 240 and 320 electrically decouple in response thereto, disconnecting the line, load, and receptacle contacts. TEST button switch 50' is accessible to the user and introduces a simulated ground fault, providing a convenient method for the user to periodically test the GFCI operation.

Device 10 may include a trip indicator. When device 10 is tripped, trip indicator 130 is activated. Trip indicator 130 includes components R9, R13, R14, and D1 (LED) which are connected in parallel with switch S7. When device 10 is tripped, LED D1 is illuminated. However, when the contacts are reset, there is no potential difference to cause illumination of LED and D1. Those of ordinary skill in the art will recognize that indicator 130 may include an audible annunciator as well as an illumination device.

After device 10 is tripped, the user typically depresses reset switch 60 to reset the device. Switch S7 is disposed in a position to supply power to the reset solenoid 64 via switch 60, 62. Once reset button 60 is depressed, a simulated fault is introduced through R1. The GFCI power supply (located at the anode of D1) supplies current to charge capacitor C9. When the detector 104 responds to the simulated fault, SCR Q1 is turned on. When SCR Q1 is turned on, the charge stored in C9 will discharge through the R16 and SCR Q2. As a result of the discharge current, SCR Q2 is turned on, current flows through reset solenoid 64, and the device 10 is reset.

Device 10 includes a timing circuit that is configured to limit the time that the reset solenoid is ON, irrespective of the duration that the reset button is depressed by the user. Momentary activation of the reset solenoid avoids thermal damage to the reset solenoid due to over-activation. This feature also avoids the possibility of the reset solenoid interfering with circuit interruption when the trip solenoid is activated.

Timing circuit 140 includes: diode D2; resistors R15, R12, and R11; capacitor C10; and transistor Q3. When the reset button 60 is depressed, C10 begins charging through D2 and R15 while the simulated fault signal through R1 is being introduced. C10 is charged to a voltage that turns transistor Q3 ON after a predetermined interval, typically one and a half line cycles (25 milliseconds). Transistor Q3 discharges capacitor C9, causing Q2 to turn off. Thus, reset solenoid 64 is activated when reset button 60 is pressed and causes SCRs Q1 and Q2 to turn on, and deactivates when transistor Q3 turns on and causes SCR Q2 to turn off. Reset solenoid 64 can be reactivated for another momentary interval if the reset button 60 is released by the user for a pre-determined duration that allows C4 to discharge to a voltage where Q3 turns off. Alternatively, a timer can establish momentary reset solenoid actuation by controlling the duration of the simulated test signal or the closure interval of contact 62. Alternatively, the timer can employ mechanical and/or electrical timing methods.

Referring to FIG. 6, if device 10 has an internal fault condition that prevents SCR Q1 from turning ON, device 10 has reached an end-of-life condition. The end-of-life circuit 120 is configured to detect an internal fault condition. When the internal fault is detected, reset solenoid 64 cannot be activated, and device 10 cannot be reset to provide power to the user receptacle terminals or the load terminals. As a result of the detection, the end-of-life circuit removes power from the user receptacles and the load terminals. Removal of power by the end-of-life circuit does not rely on the reset mechanism, the reset solenoid, or the circuit interrupter.

End-of-life (EOL) circuit 120 includes resistors R19-R25, SCR Q4, and diode D5. Resistor R23 is configured to heat to a temperature greater than a pre-established threshold when device 10 has an internal fault. When the temperature of resistor R23 is greater than the threshold, the line terminals decouple from the load terminals, independent of the four-pole interrupter contacts previously described. Alternatively, a resistor can be dedicated to each terminal. The resistors are heated independently to decouple the load terminals from the line terminals.

EOL circuit 120 operates as follows. With device 10 reset, the user pushes the TEST button 50', and a simulated fault is introduced through R25. Accordingly, 120V AC power is applied to EOL circuit 120. If the GFCI is operating properly, sensor 100, detector 104, and other GFCI circuitry will respond to the simulated fault and trip switches S3-S7 (contact pairs 24, 32; 28, 46; 240, 320; 280, 460) within a predetermined time (typically 25 milliseconds for GFCIs.) The circuit is designed such that the simulated fault current flowing through R25 is terminated while TEST button 50' is continuously being pushed. As such, power is removed from EOL circuit 120 before resistors R23 and/or R24 reach the temperature threshold.

Resistors R20-R22 and SCR Q1 form a latch circuit. When device 10 is not operating properly. The uninterrupted current through R21 will cause the resistance value of R21 to increase significantly. When resistor R21 changes value, the voltage divider formed by R21 and R22 is likewise changed. The voltage across R20 and R19 becomes sufficient to turn on Q4 and current begins to flow through resistors R23 and R 24. In a short period of time, R23 and R24 begin to overheat and the solder securing R23 and R24 to printed circuit board 12 fails. After the solder melts, resistors R23 and R24 are displaced, actuating a mechanical disconnect mechanism 121. Alternatively, the response time of R23, R24 can be designed such that the solder is melted within the time test button 50 is depressed, in which case, the latch circuit can be omitted. R23 and R24 are directly coupled to the test circuit in this embodiment.

Figure 7:
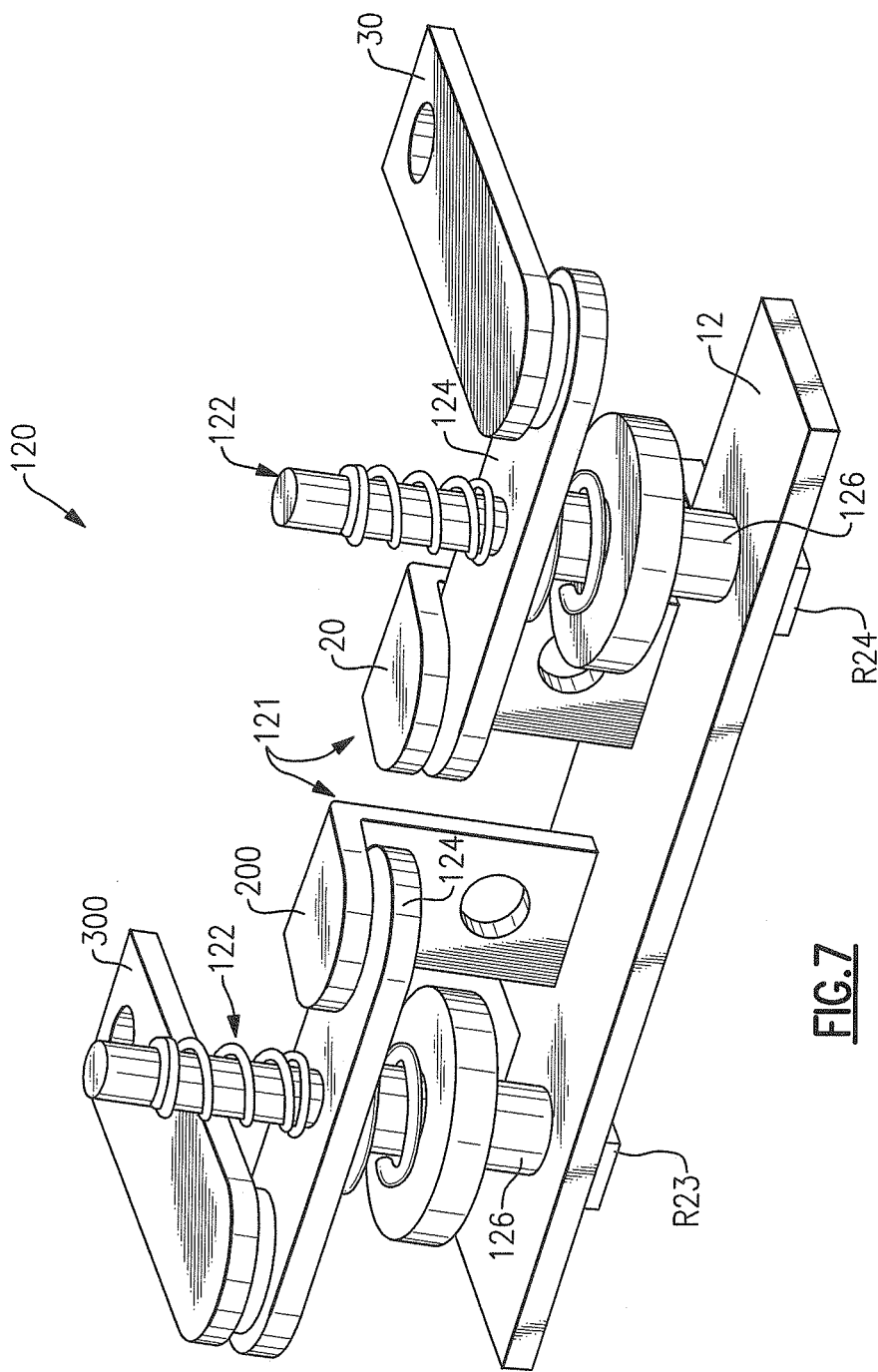
FIG. 7 is a perspective view of the end-of-life mechanism shown in FIG. 6.

FIG. 7 is a perspective view of the EOL mechanism 120 shown in FIG. 6. Resistors R23 and R24 are soldered to the underside of printed circuit board (PCB) 12. Openings are disposed in PCB 12 in alignment with resistors R23 and R24. Resistors R23 and R24 prevent spring loaded plungers 122 from extending through the openings 126 in board 12. Each plunger 122 is configured to support an electrically connecting bus-bar member 124. Each bus-bar 124 couples a line terminal (20, 200) to a load terminal (30, 300). As described above, when the solder supporting R23 and R24 melts, spring loaded plungers 122 are driven through the holes, breaking the connections between the line and load terminals. Once this occurs, there is no mechanism for resetting the device. Accordingly, the device must be replaced.

Figure 8:
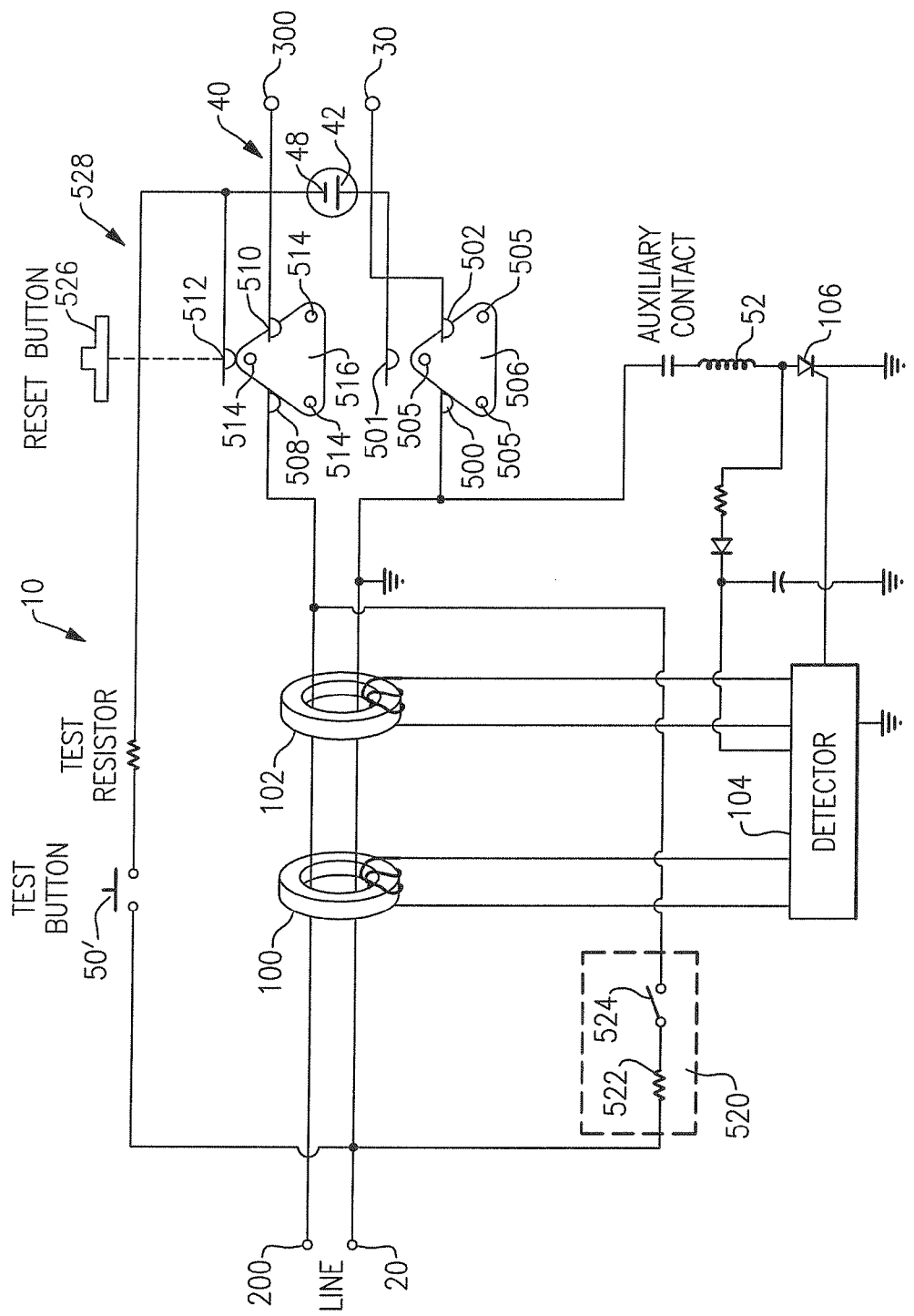
FIG. 8 is a block diagram of an electrical wiring device in accordance with a second embodiment of the present invention.

As embodied herein and depicted in FIG. 8, a block diagram of an electrical wiring device 10 in accordance with a second embodiment of the present invention is disclosed. Wiring device 10 is depicted as a GFCI. However, those skilled in the art will recognize that device 10 may be configured as an AFCI or another protective device. In this embodiment, a tri-contact design is employed. This design is also a four-pole design that is configured to deny power to the receptacles when the device is miswired and in a tripped state. Line neutral 20 is coupled to fixed neutral contact 500. Receptacle neutral contact 42 is coupled to fixed neutral contact 501. Neutral feed through terminal 30 is coupled to fixed load neutral contact 502. Each of the fixed contacts 500, 501 and 502 is paired with a moveable contact 505 disposed on tri-contact mechanism 506. On the "hot side," each of the fixed contacts 508, 510 and 512 is paired with a moveable contact 514 disposed on tri-contact mechanism 516. The wiring device tripping mechanism includes ground fault sensor 100 and grounded neutral sensor 102 coupled to detector 104. Detector 104 is coupled to silicon controlled rectifier (SCR) 106. SCR 106 is turned on in response to a detection signal from detector 104. SCR 106, in turn, signals trip solenoid 52 to move tri-contact mechanism 506 and tri-contact mechanism 516 away from the fixed contacts to thereby trip device 10.

The schematic shown in FIG. 8 may incorporate features disclosed in U.S. Pat. No. 6,522,510 which is incorporated herein by reference in its entirety. Miswire circuit 520, shown in dashed lines, is included. Circuit 520 includes a miswire resistor 522 in series with a switch 524. Switch 524 is open during manufacturing assembly to facilitate electrical testing of device 10. After device 10 has been tested, switch 524 is closed. When device 10 is properly wired, i.e., the source of power of the electrical distribution system is connected to line terminals 20 and 200, a constant current flows through resistor 522. Resistor 522 is configured to open circuit when the electrical current has flowed for a predetermined time. The predetermined time is about 1 to 5 seconds. After resistor 522 has open-circuited, reset button 526 may be depressed, enabling trip mechanism 528 to enter the reset state. Optionally, a fuse or an air gap device (not shown) may be connected in series with resistor 522. In this embodiment, resistor 522 remains closed and the fuse, or air gap device, is responsible for open-circuiting within the predetermined time.

If device 10 is miswired, the constant flow of current through resistor 522 is not present for a sufficient amount of time, and resistor 522 fails to open-circuit. However, the current that does flow through resistor 522 is sensed by differential transformer 100 as a differential current and detected by detector 104. Detector 104 signals SCR 106 to turn ON to thereby actuate solenoid 52. In turn, solenoid 52 is energized, tripping the mechanism 528. Accordingly, the current flowing through resistor 522 is interrupted before it fails. The duration of the interrupted current flow through resistor 522 is approximately the response time of device 10, e.g., less than 0.1 seconds. The duration of the current flow is too brief to cause opening of resistor 522. If reset button 526 is depressed to reset trip mechanism 528, current starts to flow again through resistor 522, however, the current is detected and mechanism 528 is immediately tripped again before resistor 522 is opened. In this manner, trip mechanism 528 does not remain in the reset state when the source of power of the power distribution system is miswired to the load terminals. Thus power is removed automatically from the receptacle terminals when the power source has been miswired to the load terminals.

Figure 9:
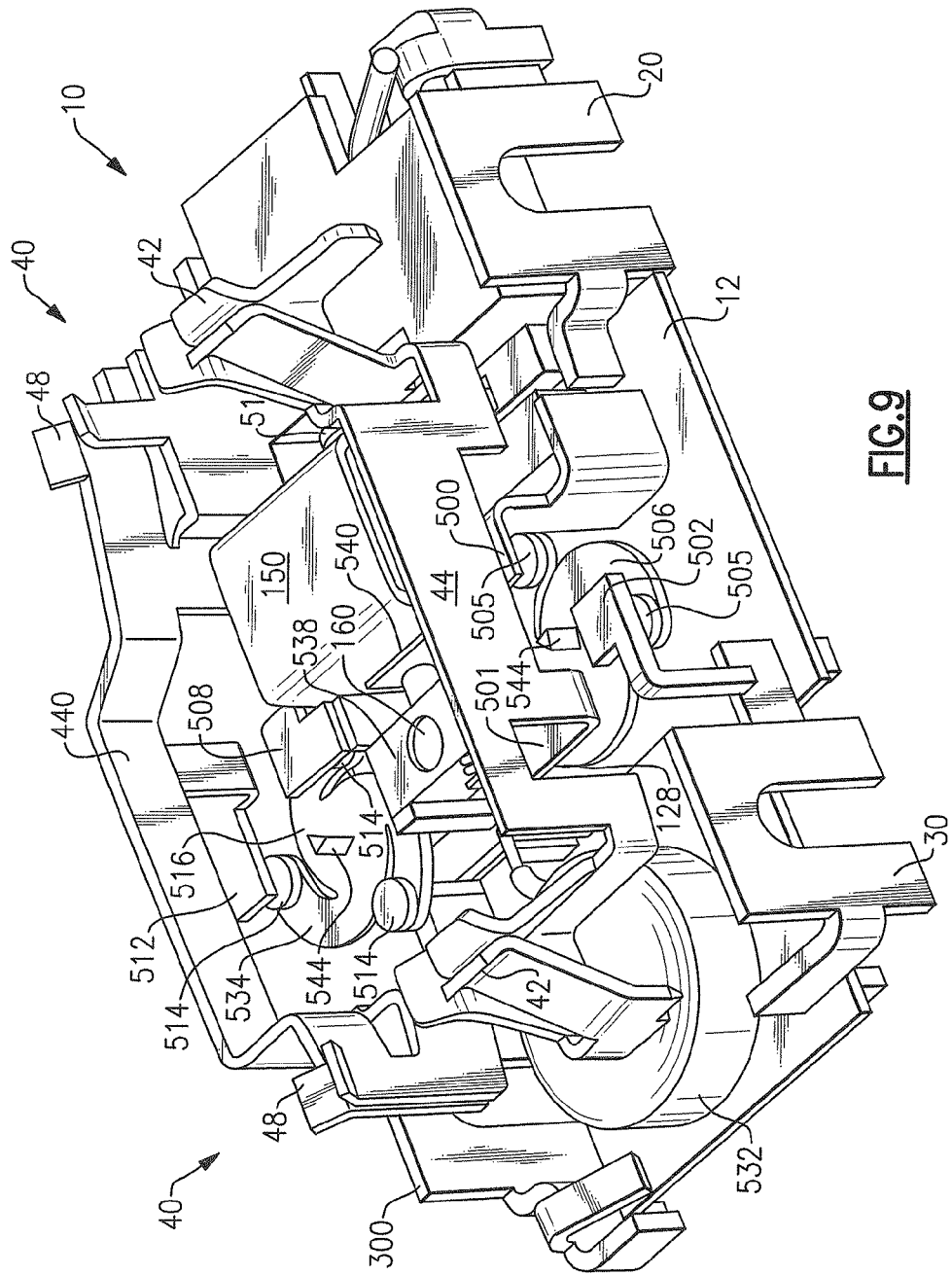
FIG. 9 is a perspective view of the electrical wiring device shown in FIG. 8.

Referring to FIG. 9, a perspective view of the electrical wiring device shown in FIG. 8 is disclosed. Protective device 10 includes a circuit board 12 which is mounted on member 118. Movistor 532, similar to movistor 14, is mounted on circuit board 12. Circuit board 12 may include either one of the protective circuits shown in FIG. 5 or FIG. 6. Device 10 is configured to be coupled to AC electrical power by way of line neutral terminal 20 and line hot terminal 200 (not shown in FIG. 9). Power is provided to a load via load neutral terminal 30 and load hot terminal 300. Device 10 also provides power to user plug contacts by way of receptacles 40. Receptacles 40 include receptacle neutral contacts 42, hot contacts 48, and ground contacts 74 (not shown.) Wiring device 10 includes four-pole functionality by virtue of tri-contact mechanisms 506, 516.

Both neutral contact mechanism 506 and hot contact mechanism 516 are configured to be moved upward and downward with respect to the fixed contacts 500, 501, 502, 508, 510 and 512 Neutral contacts 505, are disposed on curvilinear arms 534. As shown, one contact 505 corresponds to line contact 500, another to load contact 502, and yet another to fixed neutral contact 501. Referring to hot contact mechanism 516, contacts 514 are disposed on arms 536. Load hot contact 510 is not shown in FIG. 9 for clarity of illustration. However, tri-contact 516 includes three contacts 514, one contact corresponding to hot line contact 508, another to hot load contact 510, and yet another contact to hot fixed contact 512.

Figure 10:
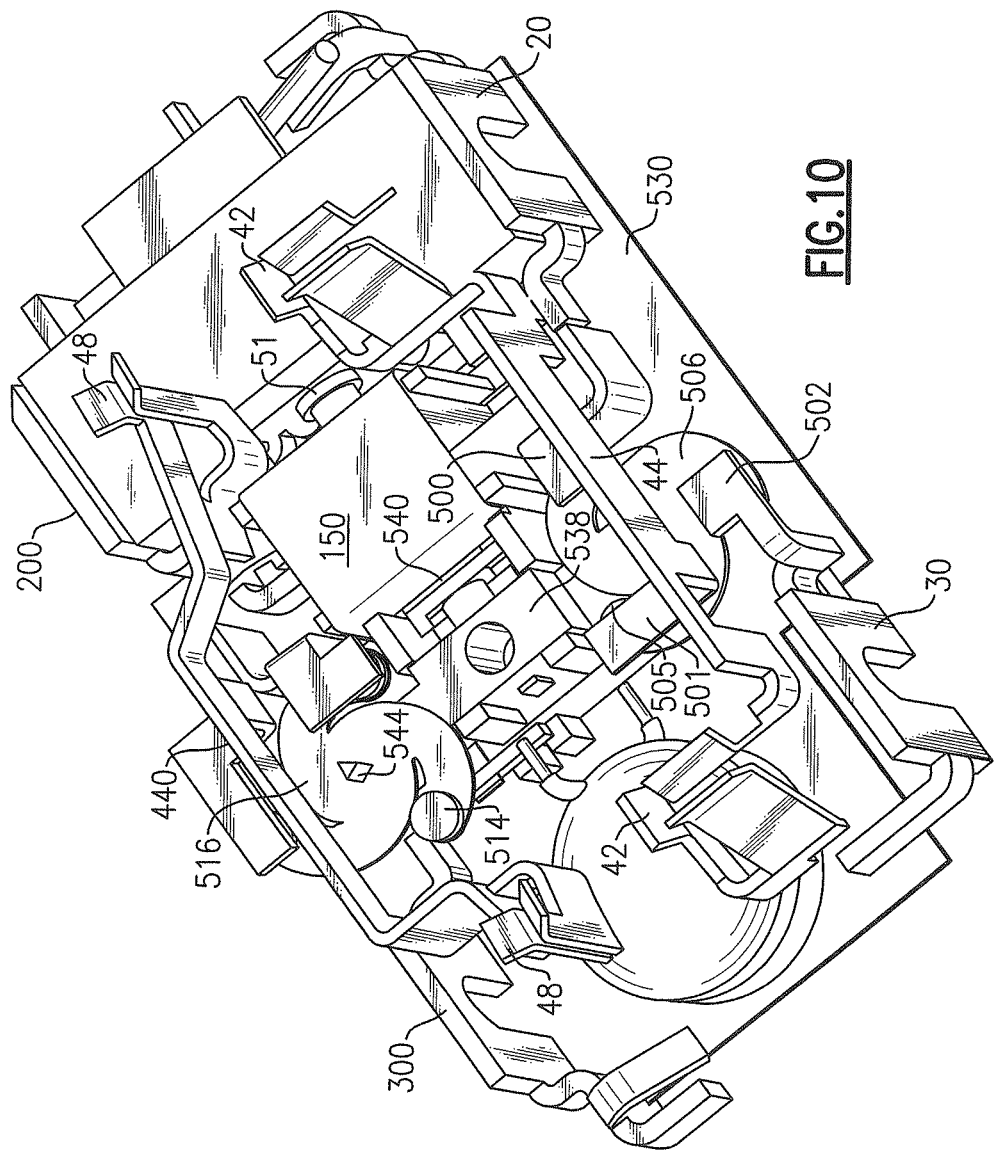
FIG. 10 is a plan view of the device shown in FIG. 8.

Referring to FIG. 10, contact mechanisms 506 and 516 are coupled to latch block 538. Latch block 538 is coupled to latch mechanism 540. Latch mechanism 540 is actuated by solenoid 52 (not shown) disposed in housing 150. Solenoid 52 is also coupled to armature 51. When the solenoid 52 is energized, armature 51 moves toward latch block 538, and latch mechanism 540 is directed with respect to latch block 538 to move latch block 538 in a downward direction, breaking the electrical connections between moveable contacts 505(514) against fixed contacts 500, 501, 502 (508, 510, 512). Latch block 538 includes a cylindrical hole that is configured to accommodate a reset pin (not shown). Reference is made to U.S. Pat. No. 6,621,388, U.S. application Ser. No. 10/729,392, and U.S. application Ser. No. 10/729,396 which are incorporated herein by reference as though fully set forth in its entirety, for a more detailed explanation of the reset mechanism.

Figure 11:
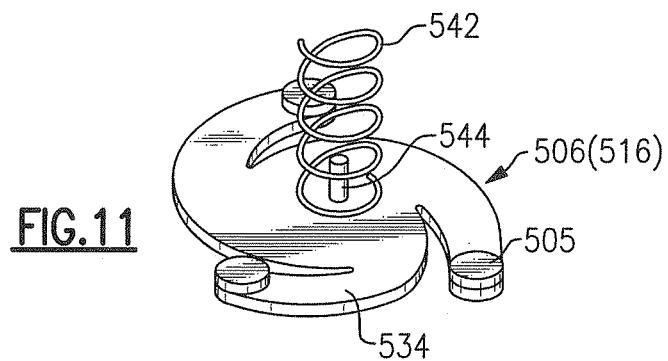
FIG. 11 is a detail view of the device shown in FIG. 8.
Figure 12:
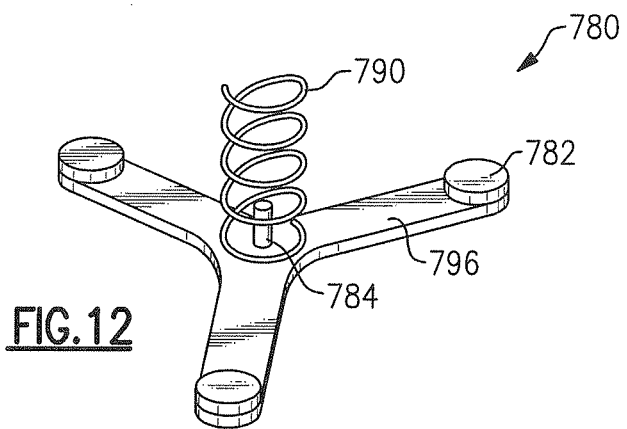
FIG. 12 is an alternate detail view of the device shown in FIG. 8.

Referring to FIG. 11, a detail view of the contact mechanism 506 shown in FIG. 9 and FIG. 10 is disclosed. As noted above, contact mechanism 506 includes contacts 505 disposed on curvilinear arms 534. Break spring 542 is disposed between contact mechanism 506 and cover (not shown). Axial member 544 may be provided to orient contact mechanism 506 with respect to latch block 538, or break spring 542 with respect to contact mechanism 506. When solenoid 52 is energized, break spring 542 forces contact mechanism 506 downward to break the contacts. It will be apparent to those of ordinary skill in the pertinent art that modifications and variations can be made to the shape of flexible contact mechanisms 506, 516 of the present invention. For example, the shape of the contact mechanism 506, 516 may be circular, triangular, Y-shaped, or any suitable shape that promotes secure contact during normal operating conditions. For example, FIG. 12 shows a Y-shaped contact mechanism 780. In this embodiment, mechanism includes contacts 782 disposed on arms 796. As in FIG. 6, break spring 790 is disposed between contact mechanism 780 and cover (not shown). When solenoid 52 is energized, break spring 790 forces contact mechanism downward to break the contacts.

Figure 13:
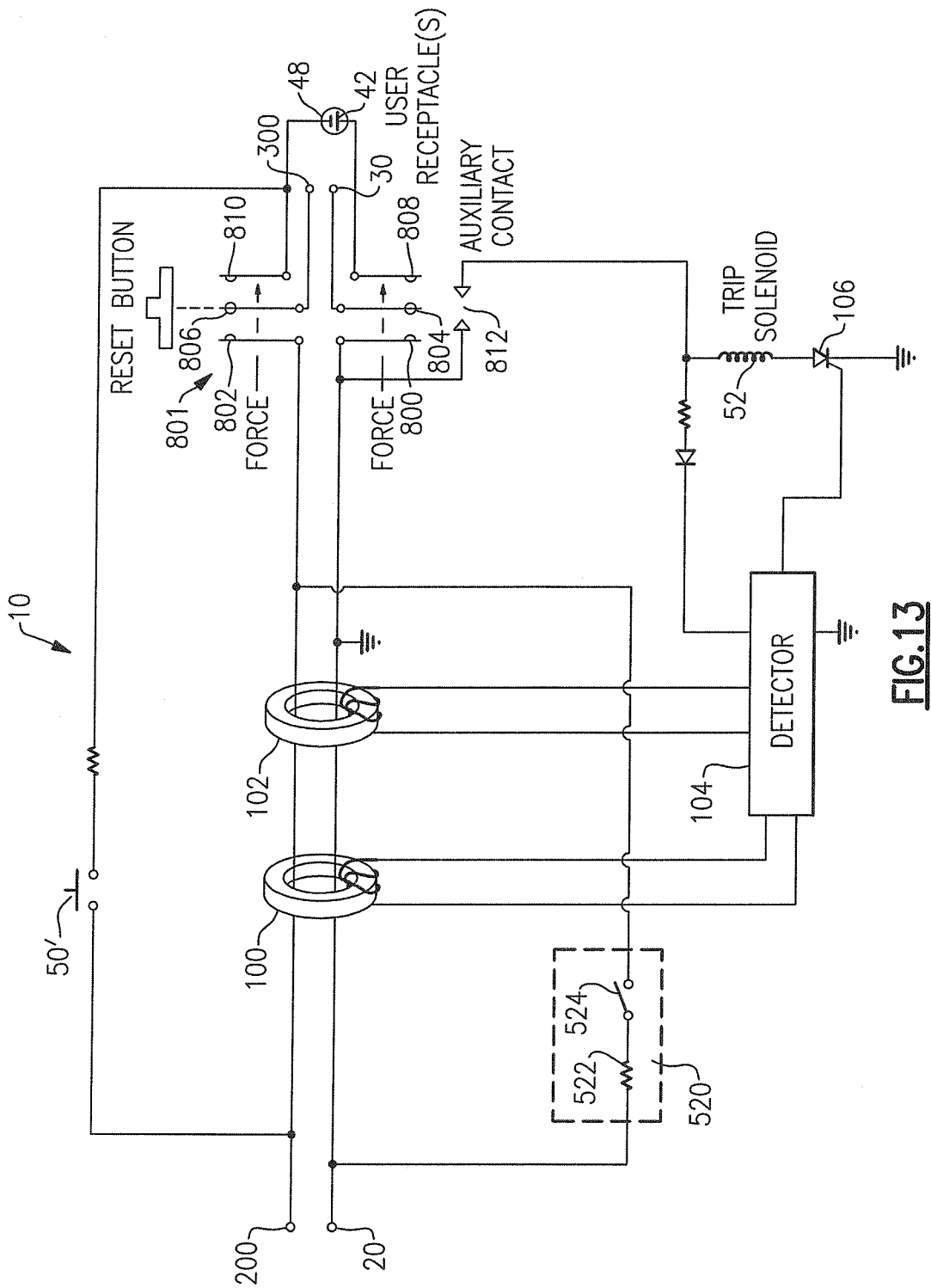
FIG. 13 is a block diagram of an electrical wiring device in accordance with a third embodiment of the present invention.

As embodied herein, and depicted in FIG. 13, a block diagram of an electrical wiring device in accordance with another embodiment of the present invention is disclosed. While device 10 is depicted as a GFCI, those skilled in the art will recognize that device 10 may include an AFCI or other such protective device. This design is referred to as a sandwiched cantilever design. This embodiment also may include either one of the protective circuits shown in FIG. 5 or FIG. 6. This embodiment is also a four-pole design that is configured to deny power to the receptacles when the device is miswired and in a tripped state. Line neutral terminal 20 is coupled moveable neutral contact 800. Receptacle neutral contact 42 is coupled to fixed neutral contact 808. Neutral load terminal 30 is coupled to moveable load neutral contact 804. Moveable load contact 804 is disposed between contact 800 and contact 808. When device 10 is reset, contacts 800, 804, and 808 are sandwiched together. The "hot side" includes analogous contacts 802, 806, and 810. The tripping mechanism includes ground fault sensor 100 and grounded neutral sensor 102 coupled to detector 104. Detector 104 is coupled to silicon controlled rectifier (SCR) 106. SCR 106 is turned on in response to a detection signal from detector 104. SCR 106, in turn, signals trip solenoid 52 to release the sandwiched cantilevers.

The stacked, or sandwiched, cantilever design described herein (FIGS. 13-22) is advantageous in that it only requires two fixed contacts. Other four-pole designs require four fixed contacts making such designs more costly. Ordinary four pole structures require four break forces to open the four contacts and four make forces to close the four contacts. One break force, as those skilled in the art will recognize, is between 50 g-100 g.

Figure 14:
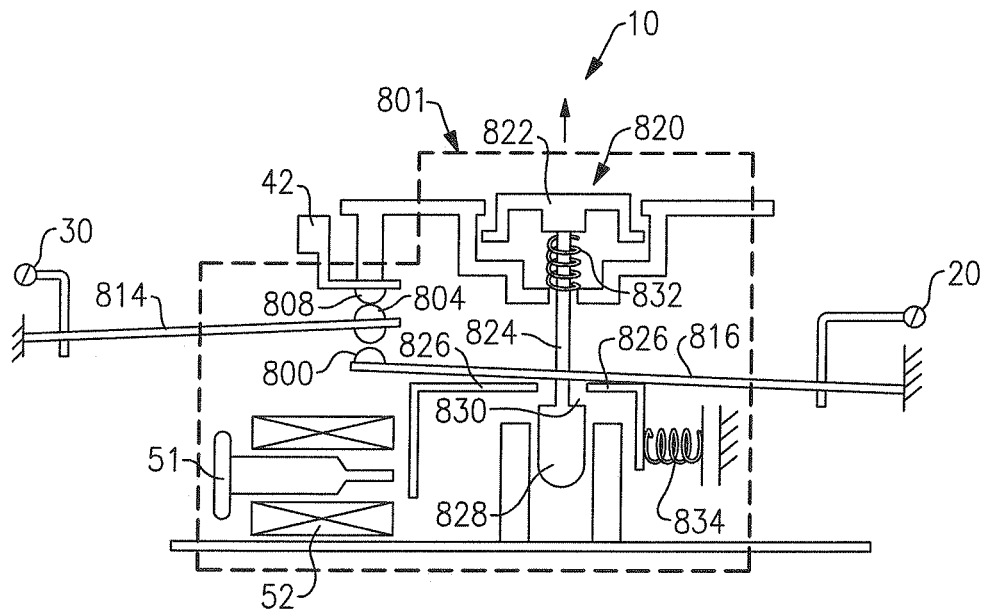
FIG. 14 is a detail view of the electrical wiring device depicted in FIG. 13.

The embodiment of FIG. 14 also requires four break forces to open the four contacts but only two make forces (on the outer cantilevers) to close the four contacts. As those of ordinary skill in the art will appreciate, a make force is typically within the range between 100 g-150 g. Therefore the sandwiched cantilever is more efficient, i.e., the contact mechanism requires less force to close the contacts during a reset operation. Accordingly, the force applied to the mechanism is reduced, resulting in less wear and tear on the trip mechanism. Of course, this extends the operational life of the mechanism. Further, the reduced force means that the trip solenoid does not have to work as hard to trip the trip mechanism. This also suggests that the solenoid may be smaller. In short, the stacked or sandwiched cantilever, depending on the terminology employed, results in a smaller device size, and cost savings.

Referring to FIG. 14, a cross-sectional view of the electrical wiring device 10 depicted in FIG. 13 is disclosed. FIG. 14 shows the device in a reset state, with the contacts closed. As described above, device 10 is coupled to the AC power source by way of neutral line terminal 20 and hot line terminal 200. As shown neutral line terminal 20 is connected to cantilever 816 by way of conductive wire 21. On the hot side, hot line terminal 200 is connected to the hot line cantilever by a conductive wire (not shown). Device 10 may be coupled to a downstream branch circuit by way of neutral load (feed-through) terminal 30 and hot load (feed-through) terminal 300. Branch circuits often include daisy-chained receptacles or switches. Device 10 includes one or more plug receptacles configured to receive plug blades electrically connected to a portable load by an electrical cord. The plug receptacles include neutral receptacle terminal 42 and hot receptacle terminal 48. For clarity of illustration, FIG. 14 only shows the neutral side of device 10.

Accordingly, neutral line terminal 20 is connected to neutral line cantilever beam 816. Cantilever beam 816 includes moveable neutral line contact 800 disposed at the end of the cantilever beam 816. Neutral load terminal 30 is connected to neutral load cantilever 814. Load cantilever beam 814 includes a double sided contact 804 disposed at the end of cantilever beam 814. Neutral receptacle terminal 42 is electrically connected to fixed terminal 808. Thus, in the reset (closed) state, neutral receptacle terminal 42 is electrically connected to a stationary (or fixed) contact 808. When device 10 is in the reset state, fixed contact 808 makes electrical connection to a neutral line contact 800 by way of a double-sided neutral load contact 804. Accordingly, electrical continuity is established through line terminal 20, cantilever 816, contacts 800, 804, 808, cantilever beam 814 and finally, load terminal 30.

The relationship between the contact arrangement described above, the trip mechanism 801, and the reset mechanism 820 is as follows. The trip mechanism includes solenoid 52, which as described above, is connected to SCR 106. In response to the signal from SCR 106, solenoid 52 generates a magnetic field that causes armature 51 to move laterally. The reset mechanism includes reset button 822 connected to reset pin 824. A spring 832 is disposed around reset pin 824. Reset pin 824 includes a plunger 828 which is inserted into a hole in latch 826 while in the closed state. In a tripped state, the reset pin 822, reset pin 824, as well as plunger 828 extend outwardly from the cover. The latch 826 cannot be lifted upward by plunger 828 because the plunger 828 does not extend into the latch hole and latching escapement 830 cannot engage latch 826.

When device 10 is reset, reset button 822 is depressed, directing the reset stem 824 and plunger 828 into a hole in latch 826. When the plunger 828 is fully extended through the hole, latch 826 moves laterally to catch escapement 830 by virtue of the biasing force provided by spring 834. The force associated with the energy stored in compressed spring 832 is greater than the tripping forces associated with the trip mechanism. Accordingly, spring 832 lifts latch 826 and cantilever 816 in an upward direction. When cantilever 816 moves upward, contact 800 engages contact 804, causing cantilever 814 to move upwardly until contact 804 engages fixed contact 808. In a reset state, button 822 is depressed and flush with the cover of device 10. As a result, spring 832 is compressed between button 822 and a portion of the cover.

In one embodiment of the present invention, the reset button assembly, i.e., reset button 822, reset pin 824, and plunger 828 are formed from a non-metallic material. In an alternate embodiment, the reset button 822, reset pin 824, and plunger 828 may be formed as an integral unit. In related art devices, the reset pin is formed of a metallic material that is cast or machined, in the desired shape and form factor, depending on the reset/latch interface. The non-metallic reset assembly of the instant embodiment may be comprised of a resinous plastic material, a nylon material, polycarbonate material, or a composite material comprising plastic and a filler material. The filler material may be selected from a group that includes glass, mineral reinforced nylon filler, perfluoropolyether (PFPE), polytetrafluoroethylene (PTFE), silicone, molybdenum disulfide, graphite, aramid fiber, carbon fiber, or metallic filler. While the reference numbers used in this paragraph follow the convention of FIG. 14, those of ordinary skill in the art will appreciate that the non-metallic reset assembly described herein is equally applicable to each and every embodiment of the present invention described in the patent disclosure.

Figure 15:
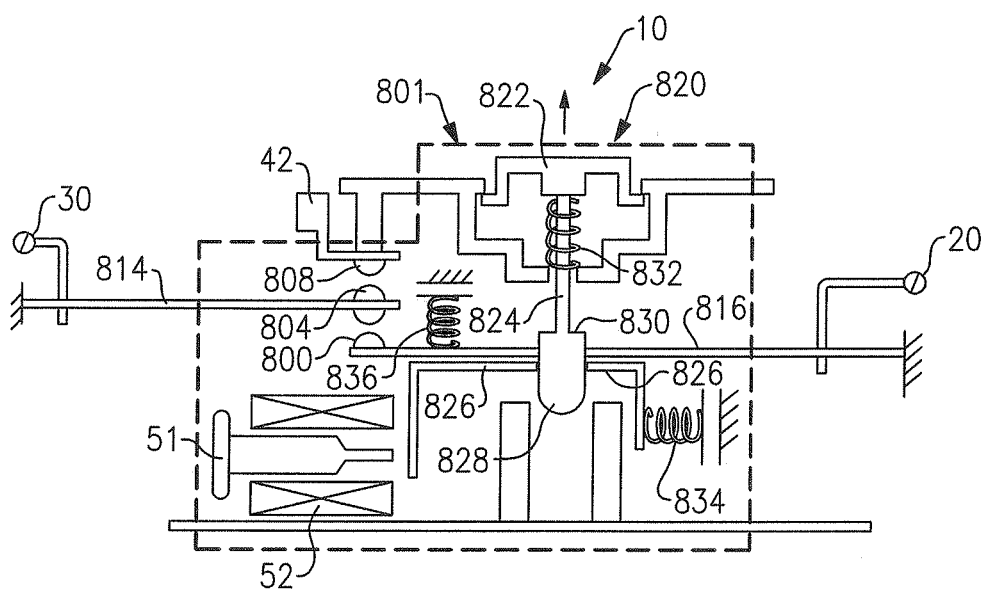
FIG. 15 is a detail view of the electrical wiring device depicted in FIG. 13.

FIG. 15 is a detail view of the electrical wiring device 10 in a tripped state. As noted above in the discussion of FIG. 13, when a fault or simulated fault is sensed and detected, the control line of SCR 106 is signaled. In response, SCR 106 triggers solenoid 52. When solenoid 52 is activated, the resultant magnetic field directs armature 51 against latch member 826 and overcomes the biasing force of spring 834. When latch member 826 moves laterally, the interference between latch 826 and escapement 830 is removed, releasing reset pin 824 from latch 826. Reset button 822 and reset pin 824 move upward, while cantilever 816 and cantilever 814 move in the opposite direction by virtue of their inherent self-bias. As a result, contacts 808, 804, and 800 separate and the device 10 is tripped.

In an alternate embodiment, a break spring 836 is coupled to cantilever 816. Break spring 836 urges cantilever 816 downward when it is no longer restrained by spring 832. In yet another alternate embodiment, break spring 836 assists the self-bias of cantilever 816 during the transition to the tripped state. Similarly, cantilever 814 may also be provided with a break spring. Accordingly, the cantilever structures employed in the sandwiched cantilever design of the present invention may be formed with a spring bias or may be formed without such bias.

Those of ordinary skill in the art will recognize that when a spring bias is induced in a cantilever part, the form is somewhat critical, since a deviation from the form may result in a part that does not conform to nominal spring bias of the part. Ordinary four pole structures may typically have four cantilevers whose forms are all critical. When break springs are used in the sandwiched cantilever design, the forms of cantilevers are not critical precisely because they are not preloaded. This results in improved circuit interrupter reliability and lower cost manufacturing processes.

Further, it will be apparent to those of ordinary skill in the art that while the fixed contact 808 as described herein is coupled to the face terminal, it may be coupled to either the feed-thru (load) terminal 30, or the line terminal 20.

Figure 16:
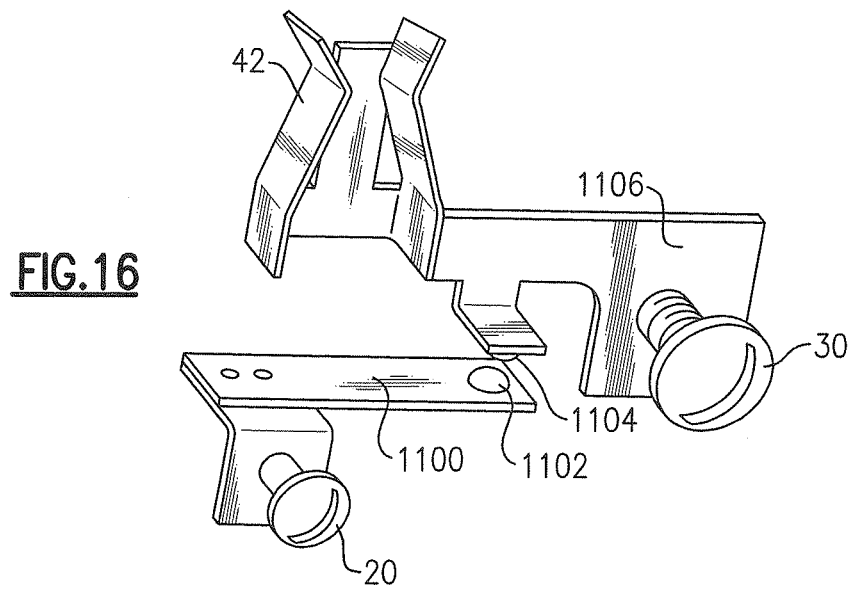
FIG. 16 is a detail view of a trip mechanism in accordance with an alternate embodiment of the present invention.

As embodied herein and depicted in FIG. 16, a detail view of a trip mechanism in accordance with an alternate embodiment of the present invention is disclosed. The trip mechanism shown in FIG. 14 and FIG. 15 has an interrupting contact structure that includes two cantilever beams. In the alternative construction, one of the dual beam structures is replaced by a single beam structure. A receptacle outlet has a plurality of receptacle terminals that are configured to mate with the attachment plug of a user attachable load. Those of ordinary skill in the art recognize that only one contact pair is needed to disconnect the load terminal from the receptacle terminal. In other words, the structure shown in FIG. 14 and FIG. 15 need only be placed in one of the conductive paths (i.e., either the hot path or the neutral path) to break the circuit and deny power to the receptacle outlet during a miswire condition. Thus, with the circuit broken in one of the conductive paths, user attachable load would not obtain the AC power needed to operate, and the user would be motivated to remedy the miswire condition before a fault condition is likely to arise. After the miswiring condition has been corrected and device 10 is in normal service, a fault condition may arise in any of the conductors connected to a load terminal. Structures such as shown in FIG. 16 can be included in other conductors for disconnecting the line terminals from load terminals, in order to protect the user after device 10 has been properly wired and is in normal usage.

Referring again to FIG. 16, the single beam structure is incorporated into, or is an extension of, the neutral line terminal 20. In particular, line terminal 20 is connected to cantilever beam 1100. Cantilever beam 1100 includes contact 1102 disposed thereon. Contact 1102 is configured to engage with fixed contact 1104. Fixed contact 1104 is disposed on unitary member 1106. Unitary member 1106 includes receptacle terminal 42 at one end and load terminal 30 at the other end. Accordingly, load terminal 30 and receptacle terminal 42 are permanently coupled electrically. Those of ordinary skill in the art will recognize that any suitable structure may be employed herein. For example, the simplified structure depicted in FIG. 16 may be replaced by any number of simplified structures known to those skilled in the art, such as a bus bar structure.

Terminals 20, 30 and 42 are coupled electrically in the reset state by cantilever 1100, which has a movable contact 1102 that engages fixed contact 1104. On the other hand, when device 10 is tripped, the electrical connection between contacts 1102 and 1104 is broken by moving the cantilever 1100. As such, load terminal 30 and receptacle terminal 42 are electrically disconnected from the line terminal 20. Alternatively, the single beam structure may be included for coupling and decoupling hot terminals 300 and 48 from hot line terminal 200.

For multi-phase systems in which there is more than one hot conductor from the AC power source, any mix and match combination of dual cantilever structures such as shown in FIGS. 14 and 15, and simplified interrupting structures, as exemplified in FIG. 16, can be included in trip mechanism 801. In a single phase system there is certainty about which of the AC power source conductors is the hot conductor. Accordingly, in one embodiment of the present invention, the dual cantilever structure shown in FIGS. 14 and 15 is implemented in the hot conductive path. However, the dual cantilever interrupting structure may be replaced in the neutral conductive path by the structure shown in FIG. 16. Furthermore, in another embodiment, the neutral line, neutral receptacle and neutral downstream terminals may be permanently joined together. Similarly, other embodiments may be implemented that mix and match combinations of structures that electrically disconnect downstream and receptacle load terminals, with simplified structures that do not electrically disconnect downstream and receptacle load terminals.

Figure 17:
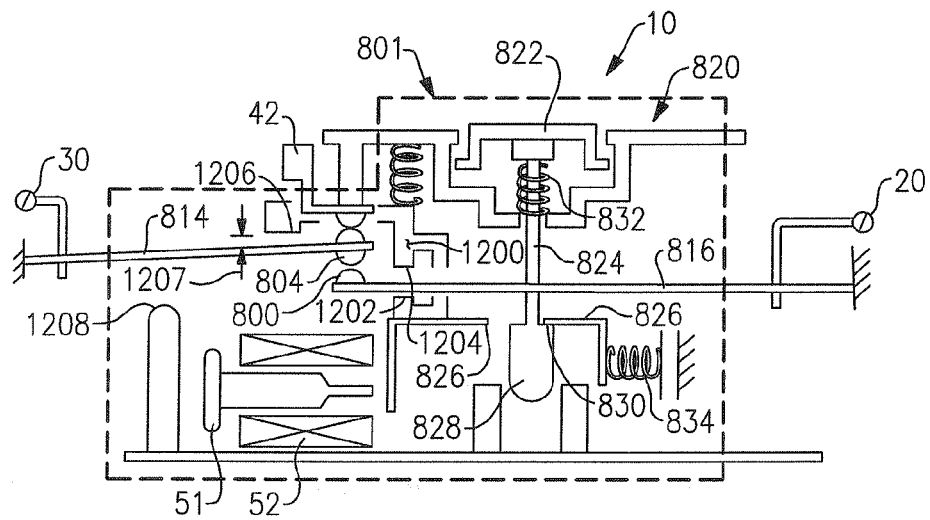
FIG. 17 is a detail view of a weld-breaking mechanism in accordance with yet another embodiment of the present invention.

As embodied herein and depicted in FIG. 17, a detail view of a weld-breaking mechanism in accordance with yet another embodiment of the present invention is disclosed. Although the interrupting contacts are intended to trip freely when a magnetic force develops in solenoid 52 to operate the trip mechanism 801, the contacts may be "welded" together and remain closed due to exposure to excessive current, corrosion, or the like, such that the contact opening forces, exerted by the cantilevers and break springs, fail to open the contacts. The present invention includes a weld breaker mechanism configured to open welded contacts. As noted above, the weld-breaking mechanism assists the break spring(s) and/or the self-bias force(s) to overcome a welded condition that binds one or more pair of contacts together. A welded condition may be a result of corrosion, dust or foreign accumulations, cold bonding, metallurgical bonding, or electrically-induced bonding.

FIG. 17 shows trip mechanism 801 in the reset state. Trip mechanism 801 includes all of the components included in the embodiment shown in FIG. 14. However, FIG. 17 also includes a latch block 1200 that is disposed between latch 826 and cantilever 816. The trip mechanism operates as before with the following enhancements. When device 10 is reset, make-spring 832 exerts an upward force on latch 826. In turn, latch 826 directs surface 1200 of latch block 1200 upward. Surface 1200 also applies a force to deflect cantilever 816 upward. Cantilever 816 causes contact 800 to engage contact 804. As cantilever 816 continues to deflect upward, cantilever 814 is also deflected until contact 804 touches fixed contact 808 to thereby complete the reset operation. Accordingly, electrical continuity is established between neutral terminals 20, 30 and 42, and electrical continuity is also established between hot terminals 200, 300 and 48.

Figure 18:
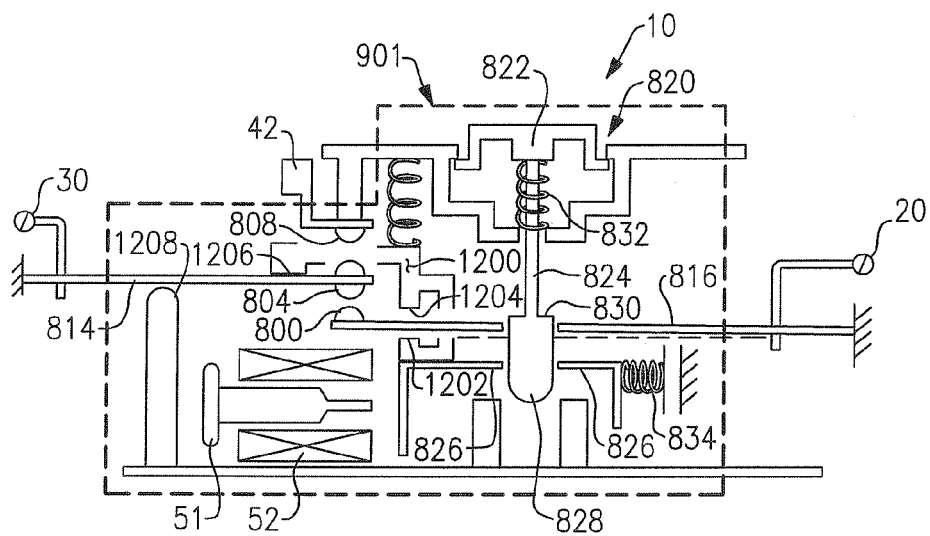
FIG. 18 is an alternate detail view of a weld-breaking mechanism shown in FIG. 17.

Referring to FIG. 18, a detail view of the weld breaking mechanism in the tripped state is shown. As noted previously, when device 10 is tripped, SCR 106 triggers solenoid 52. In response, solenoid 52 generates a magnetic field causing armature 51 to move laterally toward latch mechanism 826. Armature 51 causes latch 826 to move against the biasing force of spring 834. As before, the interference between latch 826 and escapement 830 is removed, freeing reset button 822, reset pin 824 and escapement 830 to move upward. The force exerted by make-spring 832 is no longer communicated through surface 1202 to cantilever 816. The self-bias in cantilever 814 and cantilever 816 tends to drive the cantilevers downward to open the contacts. However, contact pair 808/804 and/or 804/800 may remain in the closed position because of the occurrence of one of the weld conditions previously described.

Latch block 1200 includes weld-breaker arm 1206. Weld breaker arm 1206 is configured to break any weld that may exist between contact pair 808/804. Latch block 1200 also includes weld breaker arm 1204. Weld breaker arm 1204 is configured to break any weld that may exist between contact pair 804/800. During the tripping operation, latch block 1200 is configured to accelerate in a downward motion. With regard to contact pair 808/804, the motion of latch block 1200 causes surface 1206 to strike cantilever 814. The striking motion tends to break any weld that may have formed between contact 808 and contact 804. A similar action takes place in separating contact pair 804/800. When device 10 is tripped, latch block 1200 accelerates downwardly, causing weld breaker arm 1204 to strike cantilever 816. The striking motion is designed to break any weld that may have formed between contact 804 and contact 800.

The weld breaking mechanism also includes a stop member 1208. Stop 1208 restricts the downward movement of cantilever 814 during the tripping operation. Stop 1208 is configured to assist weld breaker arm 1204 in breaking any weld that may exist between contact pair 804/800. When weld breaker arm 1204 is moving in a downward motion, cantilever 814 is also deflecting in a downward direction. However, stop 1208 limits the downward deflection of a portion of cantilever 814. Essentially, stop 1208 applies a force in an upward direction while arm 1206 is applying a force in a downward direction. The combination of these forces tend to break any weld that may have formed between contact pair 804/800.

The present invention may be implemented with either weld breaker arm 1204, 1206, or both. Further, if both weld breakers 1204 and 1206 are provided, the striking action may be sequenced such that one weld breaker arm strikes its respective cantilever before the other arm strikes its respective cantilever. At any rate, once any welds that may exist have been broken and all contact pairs of trip mechanism 801 are open, trip mechanism 801 is in the tripped state.

Although the weld-breaking feature has been described with respect to a dual cantilever structure, a weld breaker can be configured for a single cantilever structure such as depicted in FIG. 16. Those of ordinary skill in the art will recognize that the weld breaker apparatus described herein may be implemented within any type of interrupting contact mechanism.

Figure 19:
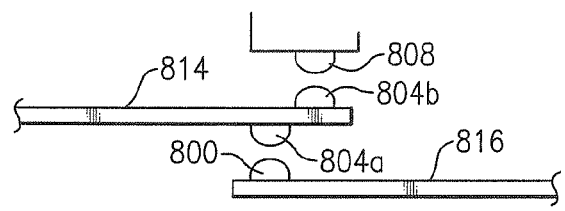
FIG. 19 is a detail view of a staggered contact arrangement in accordance with an alternate embodiment of the present invention.

FIG. 19 is a detail view of a staggered contact arrangement in accordance with an alternate embodiment of the present invention. In this embodiment, load cantilever includes staggered contact assembly 804a, 804b. Upper contact 804b is aligned with fixed contact 808. Fixed contact 808, of course, is in electrical continuity with the neutral face contact. Lower contact 804a is aligned with line contact 800. The staggered contact arrangement provides several advantages. Because the contacts are staggered, no special manufacturing techniques need be employed. The may be implemented using rivets, for example. Accordingly, the staggered contact arrangement results in reduced complexity and cost.

Figure 20:
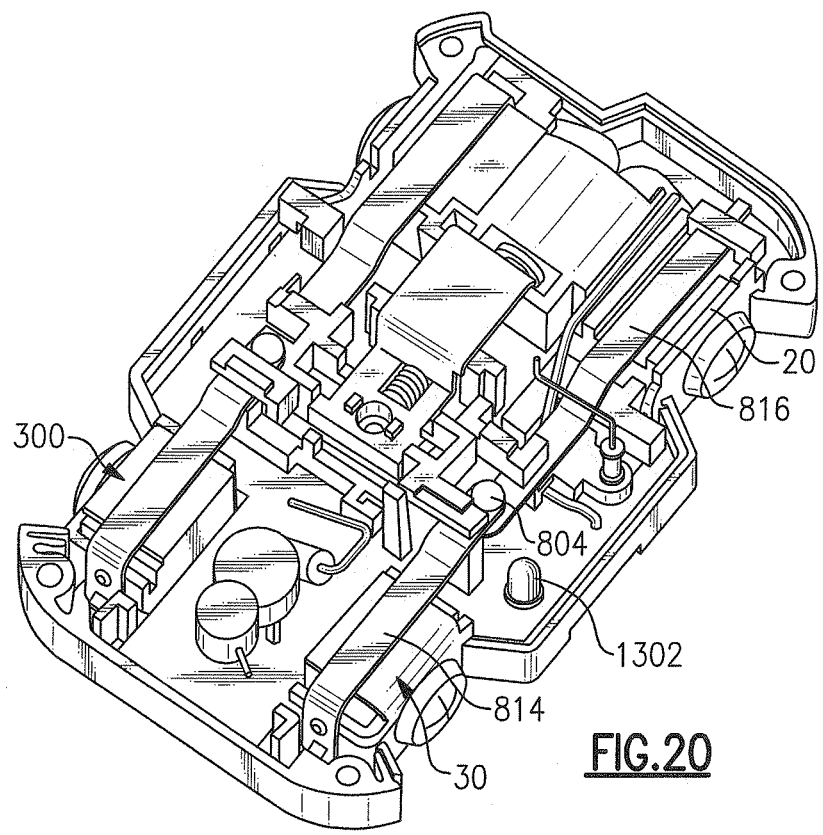
FIG. 20 is perspective view of the mechanical design of the electrical wiring device depicted in FIG. 14.

Referring to FIG. 20, a perspective view of the mechanical design of the electrical wiring device depicted in FIG. 14 is shown. In particular, FIG. 19 illustrates the layout of the cantilever structures relative to the device "footprint." Ordinary four pole structures arrange the cantilevers alongside each other. The arrangement shown in FIG. 19 arranges the cantilevers vertically. The vertical pair (814, 816) arrangement is economical when it comes to the device width. As such, space is created for a light pipe for indicators 1302 and 1304 (not shown). Accordingly, the sandwiched cantilever design accommodates a trip indicator and/or pilot indicator.

Figure 21:
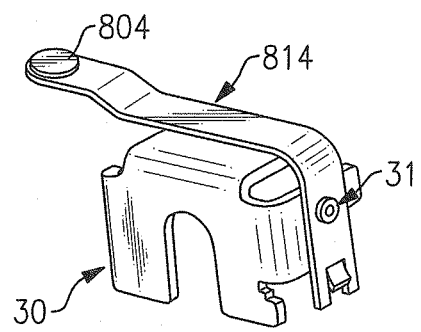
FIG. 21 is a detail view of the load terminal depicted in FIG. 19.

FIG. 21 is a detail view of the load terminal depicted in FIG. 19. Cantilever 814 is shaped to fit the form factor of terminal 30 (300) and coupled thereto by spot weld or rivet assembly 31. In an alternate embodiment, the load terminal may be comprised of a single piece of conductive material and formed into the configuration depicted in FIG. 21. The line terminals are configured in a similar fashion. As a result, the cantilever pair (814, 816) form an efficient current carrying path.

Figure 22:
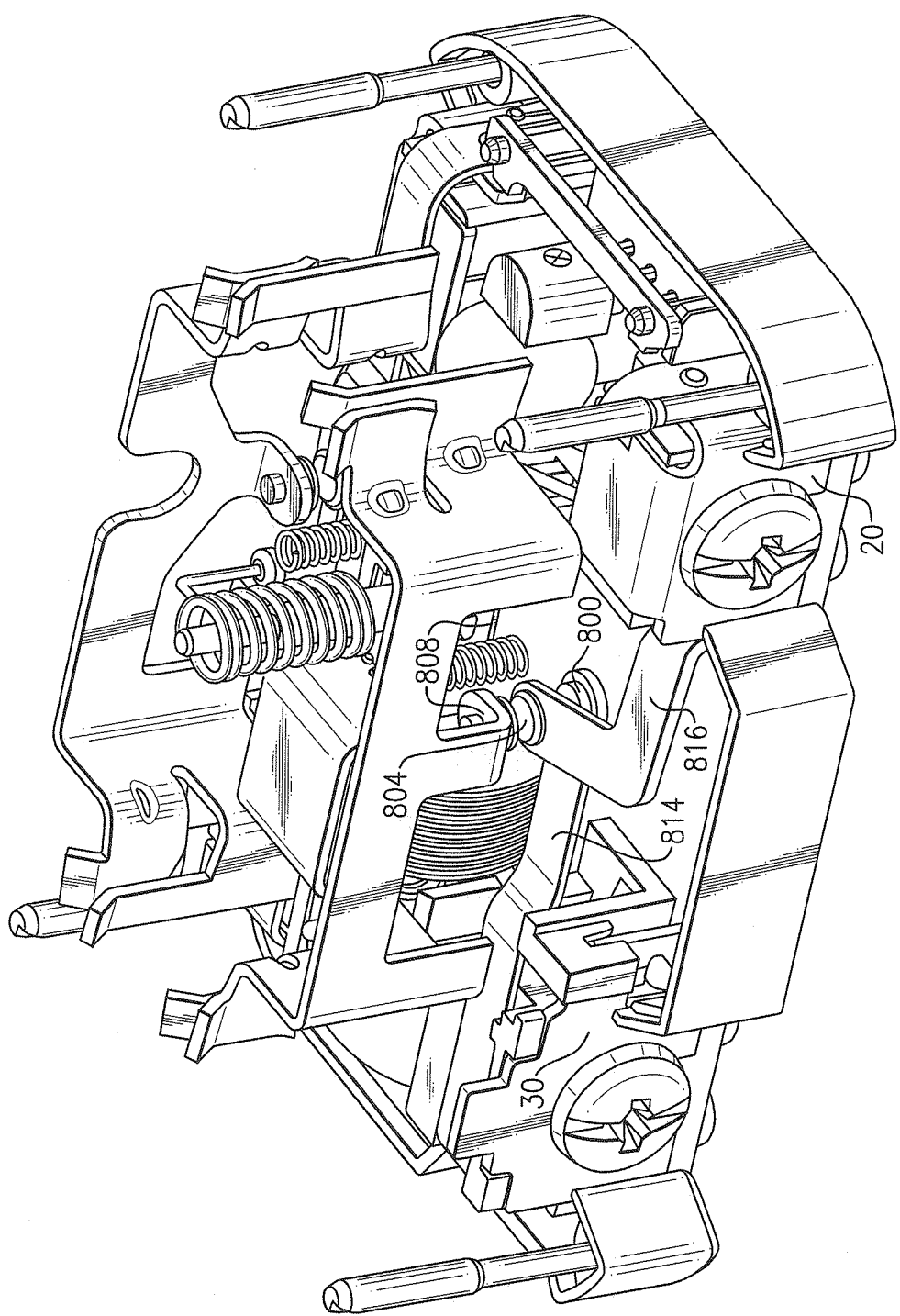
FIG. 22 is a perspective view of an electrical wiring device in accordance with a fourth embodiment of the present invention.

FIG. 22 is a perspective view of an electrical wiring device in accordance with a fourth embodiment of the present invention. In this embodiment the cantilevers may be oriented in any angular relationship one to the other, for example, at right angles as depicted in the Figure. As shown, line cantilever 816 is L-shaped to accommodate components disposed within device 10. Load cantilever 814 is similar to the cantilever structures previously shown. Those skilled in the art will recognize that the arrangement may be reversed, with the load cantilever being L-shaped.

Figure 23:
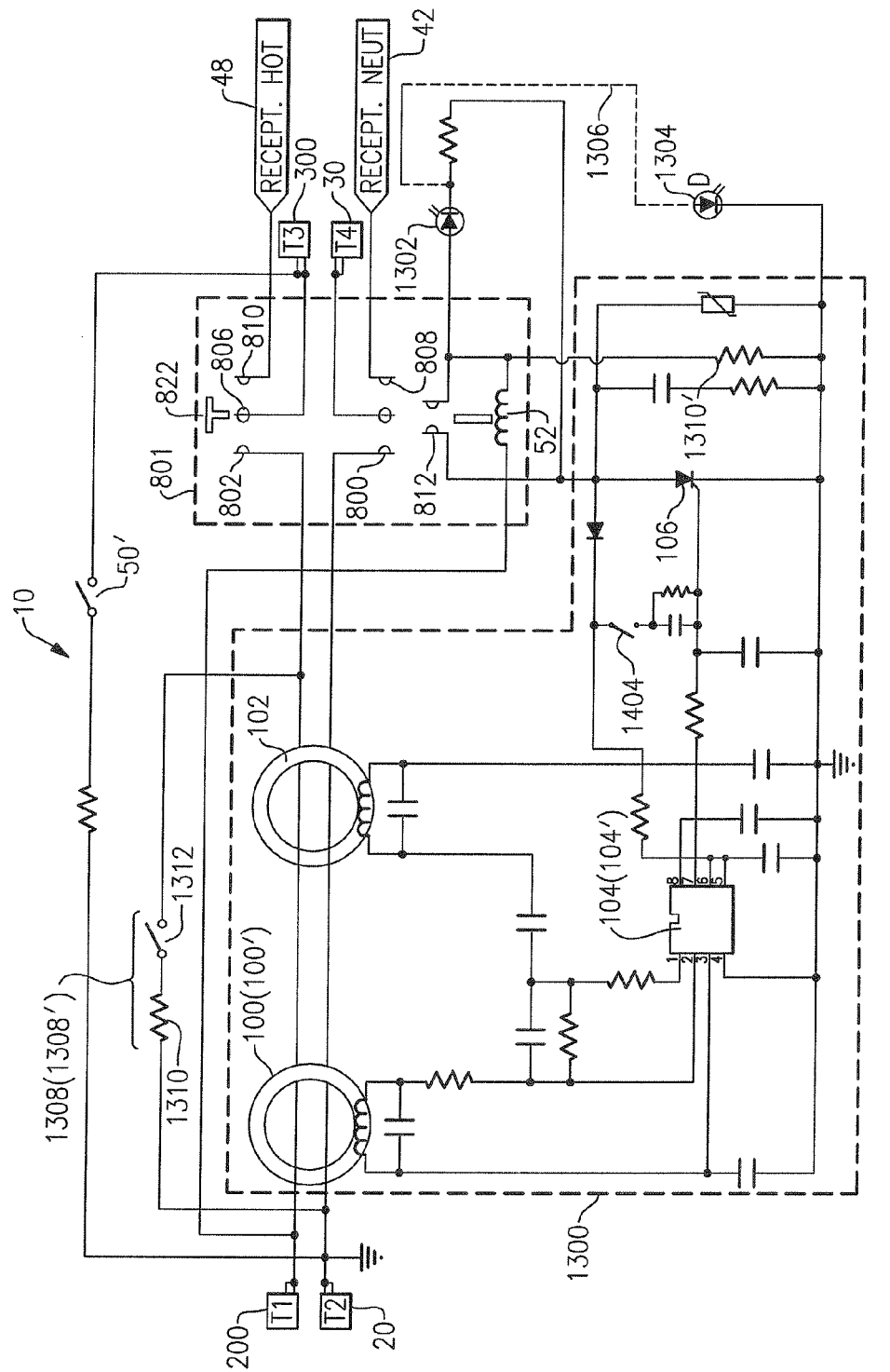
FIG. 23 is a schematic of the electrical wiring devices in accordance with the present invention.

FIG. 23 is a schematic of the electrical wiring device depicted in FIG. 13. However, the schematic of FIG. 19 is applicable to all of the embodiments disclosed herein. The protective device of the present invention is configured to sense and detect fault conditions that may occur in the electrical distribution system, as well as simulated fault conditions, that are either manually or automatically generated. Fault conditions may include arc faults, ground faults, or both.

Referring to FIG. 23, device 10 includes three main portions: a detection circuit 1300, a miswire detection circuit 1308, and tripping mechanism 801. Detection circuit 1300 includes differential transformer 100. Transformer 100 is configured to sense a difference in the current between the hot and neutral conductors connected respectively to terminals 20 and 200. The difference current is generated by a fault current to ground when a person is contacting ground at the same time as an inadvertently exposed hot conductor connected to terminals 300 or 48 (the current through the person flows through the hot conductor but does not return through the neutral conductor.) The sensed signal is detected by detector 104 which can include any of a variety of integrated detection circuits, such as the RV 4141 manufactured by Fairchild Semiconductor Corporation. The detected signal turns on SCR 106 to actuate solenoid 52 to trip the trip mechanism 801 as has been described.

In one embodiment of the present invention, trip mechanism 801 includes an auxiliary switch 812. Auxiliary switch contacts 812 open when trip mechanism 801 is in the tripped position. If SCR 106 has reached end-of-life and is permanently ON, auxiliary switch 812 assures that solenoid 52 is not permanently connected to a source of current. Otherwise, solenoid 52 may become thermally damaged by continuous exposure to the current, and be unable to operate trip mechanism 801 to interrupt a fault condition. If SCR 106 has reached end of life, and reset button 822 is depressed to close the various contacts associated with trip mechanism 801, auxiliary switch 812 closes. In response thereto, solenoid 52 will immediately trip the mechanism again. Thus, auxiliary contacts 812 ensure that trip mechanism 801 will not remain reset when an end-of-life condition has been reached. Accordingly, load terminals 30 and 300, and receptacle terminals 42 and 48 cannot be permanently connected to line terminals 200 and 20 when SCR 106 has reached end of life, sometimes referred to as safe failure of device 10.

The present invention also includes a trip indicator. Indicator 1302 is coupled to auxiliary switch 812. When trip mechanism 801 is in the tripped state, indicator 1302 is illuminated. Indicator 1302 is thus used to indicate to the user that device 10 is tripped. Accordingly, the user realizes that device 10 is the cause of the power interruption in the circuit. Indicator 1302 furthermore demonstrates to the user if auxiliary switch 812 is able to close and open. Those of ordinary skill in the art will recognize that indicator 1302 may be implemented as a lamp, an annunciator, or both. In the ON state, indicator 1302 may transmit continuously or intermittently. Device 10 also may include a "power-on" indicator 1304. Dashed line 1306 between indicator 1304 and DC ground represents the power-on indicator circuit. Indicator 1304 is configured to demonstrate that power is being delivered to the load terminals 30 and 300, and receptacle terminals 42 and 48. Those of ordinary skill in the art will recognize that indicator 1304 may be implemented as a lamp, an annunciator, or both.

Miswire detection circuit 1308 includes a miswire resistor 1310 in series with an optional switch 1312. Switch 1312, if provided, is open during manufacturing assembly to facilitate electrical testing of device 10. After device 10 has been tested, switch 1312 is closed during assembly, before device 10 is in the commercial stream. When device 10 is properly wired, i.e., the source of power of the electrical distribution system is connected to line terminals 20 and 200, a constant current flows through resistor 1310. Resistor 1310 is configured to open circuit when the electrical current has flowed for a predetermined time. In the preferred embodiment the predetermined time is about 1 to 5 seconds. After resistor 1310 has open circuited, reset button 822 can be depressed, enabling trip mechanism 801 to enter the reset state. Optionally, a fuse or an air gap device (not shown) can be connected in series with resistor 1310 whereby resistor 1310 remains closed and the fuse or air gap device is responsible for open circuiting within the predetermined time.

If device 10 is miswired, the current fails to flow through resistor 1310 in the manner described above and resistor 1310 fails to open-circuit. Instead, the current through resistor 1310 is sensed by differential transformer 100 as a differential current. Detector 104 interprets the differential current as a fault condition. Accordingly, detector 104 signals the control input to SCR 106. SCR 106 is turned ON to thereby actuate solenoid 52. Solenoid 52 generates a magnetic field and mechanism 801 is tripped. Thus, the current flowing through resistor 1310 is interrupted before resistor 1310 open-circuits. The duration of the current flow through resistor 1310 is approximately the response time of device 10. In other words, the current flowing through resistor 1310 is interrupted in less than 0.1 seconds. As such, the duration of the current flow is too brief to cause opening of resistor 1310. If reset button 822 is depressed to reset trip mechanism 801, current starts to flow again through resistor 1310. However, the current is again detected and device 10 is immediately tripped. Accordingly, device 10 will repeatedly trip when the source of power of the power distribution system is miswired to the load terminals.

Accordingly, the present invention is configured such that contact pair 808/804 and contact pair 804/800 are open (tripped) when device 10 is miswired. The tripped state prevents the AC power source, having been miswired to the load terminals (30,300), from permanently providing power to the receptacle terminals even though a fault condition in the user attachable load might be present. Although the miswire circuit has been described with respect to a resistor 1310 that opens when the device has been properly wired, any number of fusible links familiar to those skilled in the art may be employed. The fusible link may open (clear) due to a predetermined fusing characteristic. The fusible link may be configured to open when a nearby resistance heats the fuse link to a predetermined temperature.

Those of ordinary skill in the art will recognize that there are other miswire protection methods configured to permanently block the ability to reset device 10 until device 10 has been properly wired. For example, resistor 1310 may provide a physical block that prevents interference between escapement 830 and latch 826. When device 10 is properly wired, resistor 1310 conducts a steady current which causes resistor 1310 to heat sufficiently to melt solder on its solder pads. A spring bias (not shown) may be implemented to urge resistor 1310 to dislodge. Dislodged resistor 1310, no longer providing a physical block, permits reset button 822 to establish the interference between escapement 830 and 826. Accordingly, until the device is wired properly, resistor 1310 will not be dislodged and device 10 cannot be reset.

An AFCI or other protective device may be protected from miswiring by including trip mechanism 801 and a miswiring circuit 1308'. Sensor 100' and detector 104' are configured to sense and detect the particular fault condition(s) being protected. The miswire resistor may be configured to generate a simulated fault signal. As described above, the miswire resistor clears when device 10 is properly wired. As such, the simulated fault condition is likewise cleared, permitting the trip mechanism 801 to reset. Alternatively, the miswire resistor may be configured to generate a trip signal that does not represent a fault condition. The trip signal similarly interrupts when device 10 is properly wired, permitting the trip mechanism 801 to reset. For example, miswire resistor 1310' generates a trip signal to turn SCR 1060N. Solenoid 52 is activated until device 10 is properly wired, whereupon resistor 1310' is cleared to create an open circuit.

Figure 24:
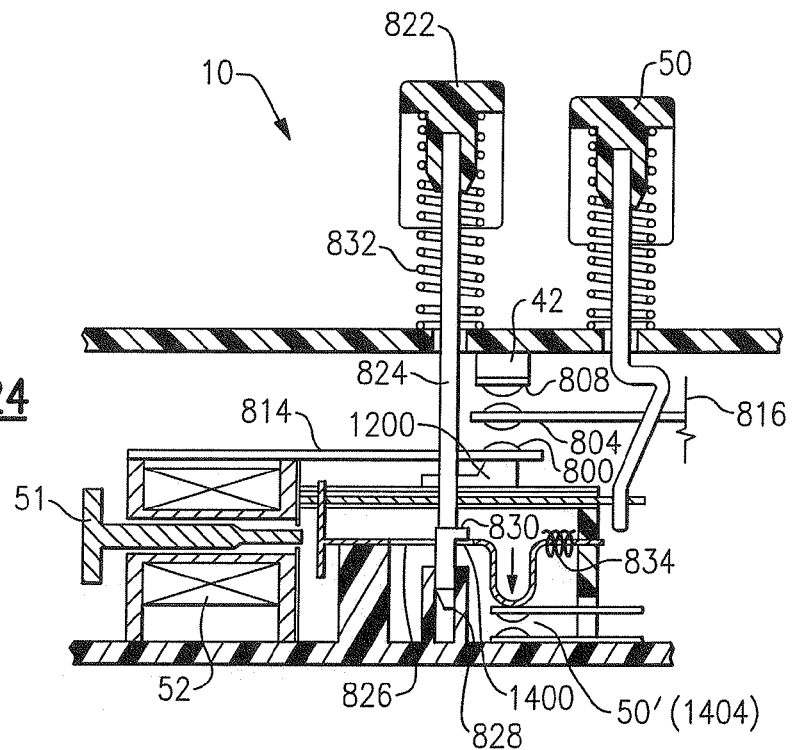
FIG. 24 is a detail view of a reset lock-out mechanism.

As embodied herein and depicted in FIGS. 24-27, a detail view of a reset lock-out mechanism is disclosed. Referring to FIG. 24, device 10 is in the tripped condition, i.e., latch 826 is not coupled to escapement 830. In order to accomplish reset, a downward force is applied to reset button 822. Shoulder 1400 on reset pin 824 bears downward on electrical test switch 50' to enable a test signal. The test signal simulates a fault condition in the electrical distribution system such as a ground fault condition or an arc fault condition.

Figure 25:
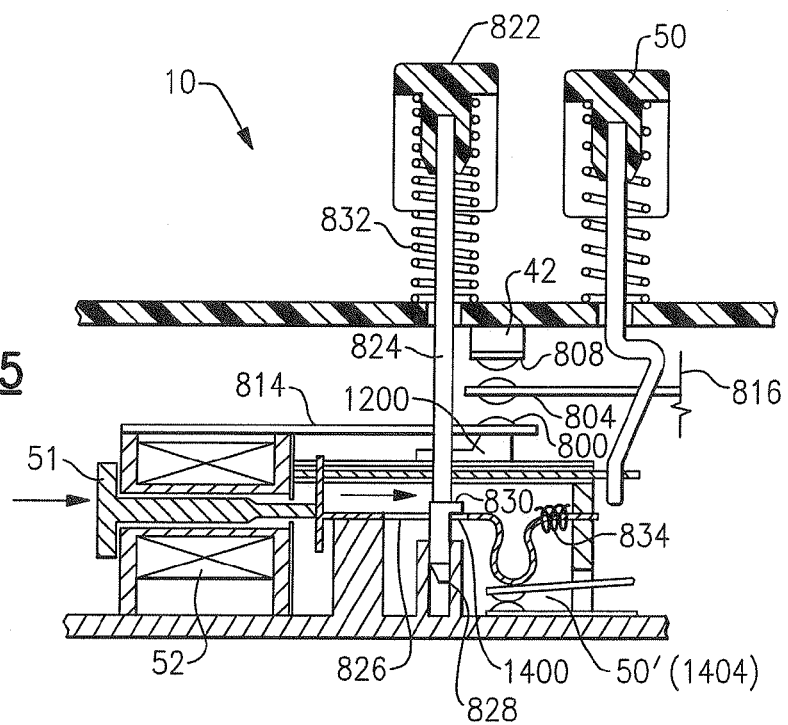
FIG. 25 is yet another detail view of a reset lock-out mechanism.

Referring to FIG. 25, the test signal is sensed and detected by detector 104. The detector provides a signal that causes solenoid 52 to activate armature 51. Armature 51 moves in the direction shown, permitting hole 828 in latch 826 to become aligned with shoulder 1400. The downward force applied to reset button 822 causes shoulder 1400 to continue to move downward, since it is no longer restrained by shoulder 1400. Since shoulder 1400 is disposed beneath latch 826, it is no longer able to apply a downward force on latch 826 to close electrical switch 50'. Accordingly, switch 50' opens to thereby terminate the activation of solenoid 52. Armature 51 moves in the direction shown in response to the biasing force of spring 834.

Figure 26:
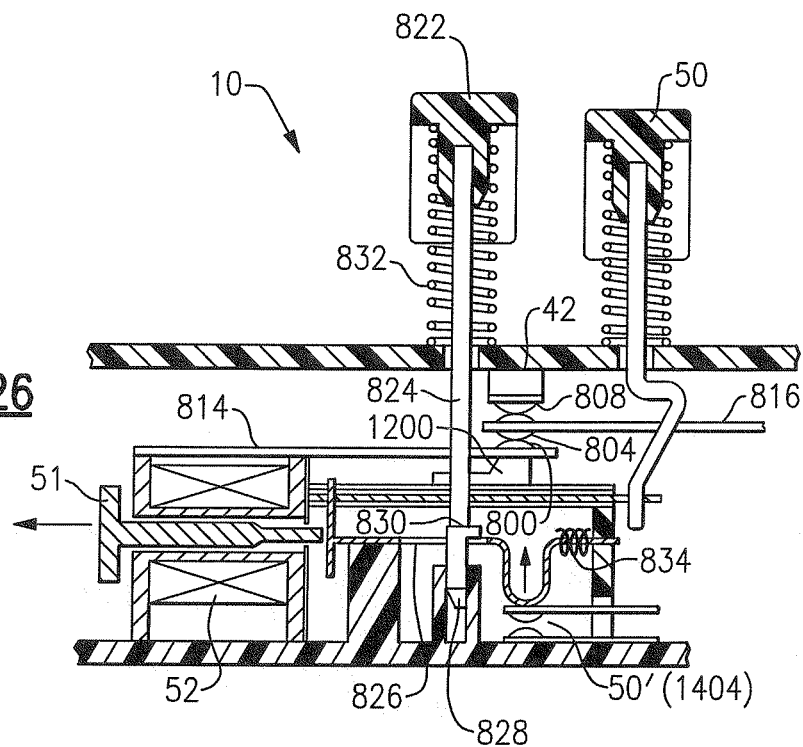
FIG. 26 is yet another detail view of a reset lock-out mechanism.

As depicted in FIG. 26, the trip mechanism is in a reset condition. In other words, any the downward force on reset button 822, as described above, is no longer present. Accordingly, latch 826 is seated on latching escapement 830.

Figure 27:
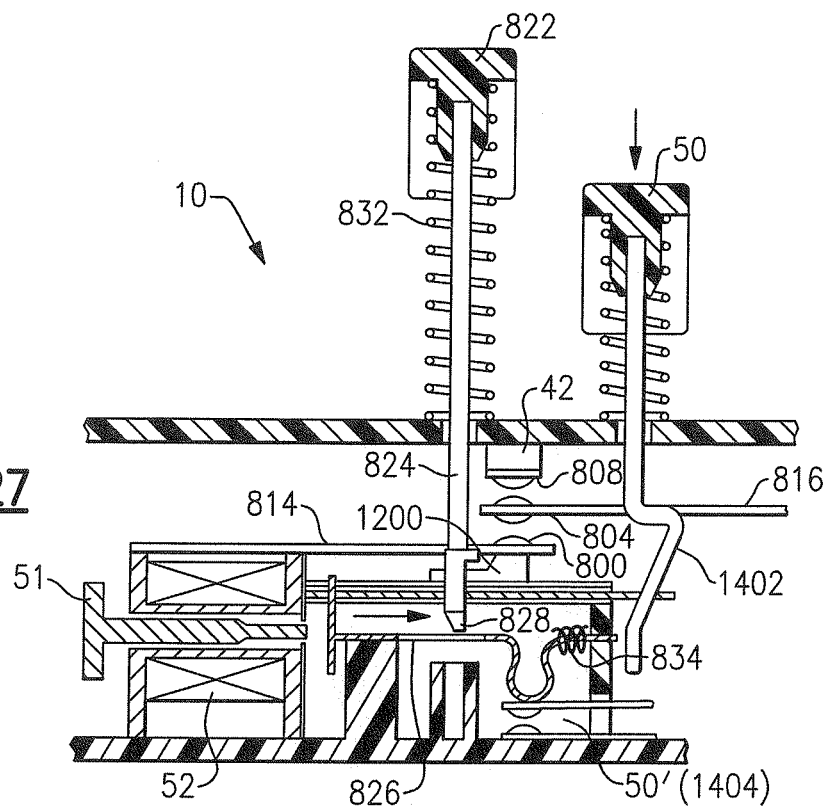
FIG. 27 is yet another detail view of a reset lock-out mechanism.

Referring to FIG. 27, a user accessible test button 50 is coupled to the trip mechanism. When test button 50 in FIG. 27 is depressed, device 10 is tripped by a mechanical linkage. In particular, when force is applied to test button 50, a mechanical linkage 1402 urges latch 826 in the direction shown. Latch 826 opposes the biasing force of spring 834. In response, hole 828 in latch 826 becomes aligned with escapement 830. The trip mechanism is tripped because latch 826 is no longer restrained by escapement 830.

As has been described, the device resets as a consequence of solenoid 52 activating armature 51. However, if the protective device 10 has reached an end-of-life condition, armature 51 is not activated. Therefore, the mechanical barrier is not removed and the mechanical bather (shoulder) prevents the trip mechanism from resetting. The physical barrier prevents the protective device from being resettable if there is an end-of-life condition.

Referring back to FIG. 23, the application of force to reset button 822 can close switch contacts 1404. When contacts 1404 are closed, a portion of the protective device is tested. A simulated fault condition test of the protective device may be provided by replacing mechanically linked test button 50 by an electrical test button 50'.

In an alternative embodiment, the simulated test signal may be derived from the line side of the interrupting contacts. This may be useful if the device is placed in the commercial stream with the interrupting contacts in the tripped position. Thus, when the AC power source is miswired to the feed-through terminals a test signal, that tests the entire device or a portion of the device, is not generated. Since the test signal is not generated, the mechanical barrier is not removed. As such, the mechanical barrier prevents the trip mechanism from being reset. The physical barrier also prevents the protective device from being reset in a miswired condition. If there is an open neutral condition, no test signal is generated. Accordingly, the device cannot be reset in an open-neutral condition either.

In yet another embodiment, a sandwiched cantilever mechanism may be incorporated in a protective device that is configured to lock-out power, or activate an indicator, or both, in response to an end-of-life condition. The indicator may be a visual and/or audible indicator. A visual indicator may be of various colors. The indicator may be steady or intermittent, e.g., a flashing red indicator. Reference is made to U.S. patent application Ser. No. 10/729,392 and U.S. patent application Ser. No. 10/729,396, which are incorporated herein by reference as though fully set forth in their entirety, for a more detailed explanation of a protective device with end-of-life lockout and indicator.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening.

The recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not impose a limitation on the scope of the invention unless otherwise claimed.

No language in the specification should be construed as indicating any non-claimed element as essential to the practice of the invention.

It will be apparent to those skilled in the art that various modifications and variations can be made to the present invention without departing from the spirit and scope of the invention. There is no intention to limit the invention to the specific form or forms disclosed, but on the contrary, the intention is to cover all modifications, alternative constructions, and equivalents falling within the spirit and scope of the invention, as defined in the appended claims. Thus, it is intended that the present invention cover the modifications and variations of this invention provided they come within the scope of the appended claims and their equivalents.

What is claimed is:

1. A protective device comprising:
    a housing assembly including a plurality of first terminals and a plurality of second terminals;
    at least one detection circuit at least partially disposed on a printed circuit board (PCB) and coupled to the plurality of first terminals or the plurality of second terminals, the at least one detection circuit being configured to detect at least one fault condition and provide a fault detection signal in response thereto, the at least one fault condition including a simulated fault condition;
    a circuit interrupting assembly coupled to the at least one detection circuit, the circuit interrupting assembly including at least one first conductor coupled to the plurality of first terminals and at least one second conductor coupled to the plurality of second terminals, a plurality of circuit interrupting contacts being disposed on and distributed between the at least one first conductor and the at least one second conductor, the circuit interrupting assembly being movable between a reset position and a tripped position such that the plurality of circuit interrupting contacts are electrically coupled in the reset position and electrically decoupled in the tripped position, the at least one first conductor or the at least one second conductor including at least two of the plurality of circuit interrupting contacts disposed thereon; and
    at least one first stop member disposed proximate the at least one first conductor and at least one second stop member disposed proximate the at least one second conductor, the at least one first stop member being configured to limit the movement of the at least one first conductor in the direction of the PCB when the circuit interrupting assembly moves from the reset position to the tripped position, the at least one second stop member being configured to limit the movement of the at least one second conductor in the direction of the PCB when the circuit interrupting assembly moves from the reset position to the tripped position.

2. The device of claim 1, wherein the at least one first stop member and the at least one second stop member are configured such that a gap is established between separable contacts of the plurality of circuit interrupting contacts in the tripped position, the gap being substantially greater than or equal to a predetermined distance.

3. The device of claim 1, wherein the at least one first stop member or the at least one second stop member is substantially fixed relative to the housing assembly.

4. The device of claim 1, wherein the at least two of the plurality of circuit interrupting contacts are disposed on opposing sides of the at least one first conductor or the at least one second conductor.

5. The device of claim 1, wherein the at least two of the plurality of circuit interrupting contacts are disposed in substantially a planar arrangement.

6. The device of claim 1, wherein the at least one first conductor includes a first cantilevered structure configured to rotate about a first fixed axis and the at least one second conductor includes a second cantilevered structure configured to rotate about a second fixed axis.

7. The device of claim 6, wherein the first cantilevered structure is configured to rotate in a first direction when the second cantilevered structure is rotating in a second direction.

8. The device of claim 7, wherein the first direction is substantially opposite the second direction.

9. The device of claim 1, wherein the housing assembly includes a front cover and a body member, the front cover including a plurality of user-accessible receptacle openings disposed therein, the plurality of user-accessible receptacle openings providing access to a plurality of receptacle contacts substantially disposed within an interior region between the front cover member and the body portion.

10. The device of claim 9, wherein the plurality of receptacle contacts are electrically disconnected from the plurality of circuit interrupting contacts in the tripped position.

11. The device of claim 9, wherein the plurality of receptacle contacts are coupled to at least one third conductor.

12. The device of claim 11, wherein the at least one third conductor includes at least one third circuit interrupter contact electrically connected to the plurality of circuit interrupting contacts in the reset position and electrically disconnected from the plurality of circuit interrupting contacts in the tripped position.

13. The device of claim 1, wherein the at least one first conductor is a line conductor and the at least one second conductor is a load conductor, or the at least one second conductor is a line conductor and the at least one first conductor is a load conductor.

14. The device of claim 1, wherein the at least one first conductor includes a first line conductor and a first load conductor, and wherein the least one second conductor includes a second line conductor and a second load conductor, a first plurality of the plurality of circuit interrupting contacts being disposed on and distributed between the first line conductor and the first load conductor and a second plurality of the plurality of circuit interrupting contacts being disposed on and distributed between the second line conductor and the second load conductor.

15. The device of claim 14, wherein the at least one first stop member includes a first line stop member disposed proximate the first line conductor and a first load stop member disposed proximate the first load conductor, the first line stop member and the first load stop member being configured to limit the movement of the first line conductor and the first load conductor, respectively, when the circuit interrupting assembly moves between the reset position and the tripped position.

16. The device of claim 14, wherein the at least one second stop member includes a second line stop member disposed proximate the second line conductor and a second load stop member disposed proximate the second load conductor, the second line stop member and the second load stop member being configured to limit the movement of the second line conductor and the second load conductor, respectively, when the circuit interrupting assembly moves between the reset position and the tripped position.

17. The device of claim 1, further comprising at least one third member disposed proximate the at least one first conductor such that the at least one first conductor is disposed between the at least one first stop member and the at least one third member.

18. The device of claim 1, further comprising at least one fourth member disposed proximate the at least one second conductor such that the at least one second conductor is disposed between the at least one second stop member and the at least one fourth member.

19. A protective device comprising:
a housing assembly including a plurality of first terminals and a plurality of second terminals;
at least one detection circuit coupled to the plurality of first terminals or the plurality of second terminals, the at least one detection circuit being disposed on a support substrate and configured to detect at least one fault condition and provide a fault detection signal in response thereto, the at least one fault condition including a simulated fault condition;
a circuit interrupting assembly coupled to the at least one detection circuit, the circuit interrupting assembly including at least one first conductor coupled to the plurality of first terminals and at least one second conductor coupled to the plurality of second terminals, at least one of the at least one first conductor or the at least one second conductor being substantially fixed at one end thereof, a plurality of circuit interrupting contacts being disposed on and distributed between the at least one first conductor and the at least one second conductor, the at least one first conductor being a line conductor and the at least one second conductor the plurality of circuit interrupting contacts not being directly disposed on the support substrate, being a load conductor or the at least one second conductor being a line conductor and the at least one first conductor being a load conductor, the circuit interrupting assembly being movable between a reset position and a tripped position such that the plurality of circuit interrupting contacts are electrically coupled in the reset state and electrically decoupled in the tripped state; and
at least one first stop member disposed on the support substrate and positioned proximate the at least one first conductor, the at least one first stop member being configured to limit the movement of the at least one first conductor when the circuit interrupting assembly moves between the reset position and the tripped position such that a gap is established between the plurality of circuit interrupting contacts in the tripped state, the gap being substantially greater than or equal to a predetermined distance.

20. The device of claim 19, wherein the at least one stop member is disposed in a substantially fixed position relative to the housing assembly.

21. The device of claim 19, further comprising at least one second stop member configured to limit the movement of the at least one second conductor when the circuit interrupting assembly moves between the reset position and the tripped position such that the gap is established between the plurality of circuit interrupting contacts in the tripped state.

22. The device of claim 21, wherein the at least one first conductor includes a first cantilevered structure configured to rotate about a first fixed axis and the at least one second conductor includes a second cantilevered structure configured to rotate about a second fixed axis.

23. The device of claim 22, wherein the first cantilevered structure is configured to rotate in a first direction when the second cantilevered structure is rotating in a second direction.

24. The device of claim 23, wherein the first direction is substantially opposite the second direction.

\* \* \* \* \*